(12) United States Patent
Baumann et al.

(10) Patent No.: US 10,830,504 B2
(45) Date of Patent: Nov. 10, 2020

(54) ADSORPTION COOLING SYSTEM USING METAL ORGANIC FRAMEWORKS

(75) Inventors: Theodore F. Baumann, Discover Bay, CA (US); Joe H. Satcher, Jr., Patterson, CA (US); Joseph C. Farmer, Tracy, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 1408 days.

(21) Appl. No.: 13/457,331

(22) Filed: Apr. 26, 2012

(65) Prior Publication Data

US 2013/0283849 A1    Oct. 31, 2013

(51) Int. Cl.
  *F25B 17/00* (2006.01)
  *B23P 15/26* (2006.01)
  *F25B 17/08* (2006.01)

(52) U.S. Cl.
  CPC ......... *F25B 17/08* (2013.01); *Y10T 29/49359* (2015.01)

(58) Field of Classification Search
  CPC .............. B01J 2231/763; B01J 31/1691; B01J 20/226; F25B 27/007; F25B 17/00;
  (Continued)

(56) References Cited

U.S. PATENT DOCUMENTS 5,157,010 A * 10/1992 Maus ................. B01J 35/04
                                                          428/593
6,491,740 B1 * 12/2002 Wang ................. B01D 53/02
                                                          502/400

(Continued)

FOREIGN PATENT DOCUMENTS

WO    2006/110740 A2    10/2006
WO    2006/127652 A2    11/2006
(Continued)

OTHER PUBLICATIONS

Yang et al., "Molecular Simulation of CO2/H2 Mixture Separation in Metal-organic Frameworks: Effect of Catenation and Electrostatic Interactions," Thermodynamics and Chemical Engineering Data, Chinese Journal of Chemical Engineering, vol. 17, No. 5, 2009, pp. 781-790.
(Continued)

*Primary Examiner* — Jianying C Atkisson
*Assistant Examiner* — Meraj A Shaikh
(74) *Attorney, Agent, or Firm* — Zilka-Kotab, P.C.

(57) ABSTRACT

An adsorptive cooling system includes: a first highly adsorptive structure positioned to receive thermal energy from a thermal energy source, including: a first substrate; and a first metal-organic framework (MOF) coupled to the first substrate and adapted for adsorbing and desorbing a refrigerant under predetermined thermodynamic conditions; a second highly adsorptive structure positioned to receive thermal energy from the thermal energy source including: a second substrate; and a second MOF coupled to the second substrate and adapted for adsorbing and desorbing a refrigerant under predetermined thermodynamic conditions; a cooling unit; and a circulation system adapted for circulating refrigerant from the first highly adsorptive structure and the second highly adsorptive structure to the cooling unit to provide cooling from the thermal energy source and to return the refrigerant to at least one of the first highly adsorptive structure and the second highly adsorptive structure.

20 Claims, 17 Drawing Sheets

(58) Field of Classification Search
CPC ......... F25B 17/08; Y02B 10/20; Y02B 10/24; B23P 15/26
USPC .... 62/476, 477, 56, 101, 238.1; 29/890.035; 502/401; 126/687
See application file for complete search history.

(56) References Cited

U.S. PATENT DOCUMENTS

| | | | |
|---|---|---|---|
| 6,946,164 | B2 | 9/2005 | Huang |
| 7,517,396 | B2 | 4/2009 | Arnold et al. |
| 7,648,568 | B2 | 1/2010 | Arnold et al. |
| 7,662,746 | B2 | 2/2010 | Yaghi et al. |
| 8,016,125 | B2 | 9/2011 | Lockledge et al. |
| 8,425,674 | B2 * | 4/2013 | Minhas ............... B01J 20/3204 62/480 |
| 8,613,204 | B2 * | 12/2013 | Farmer ................ F25B 27/007 126/705 |
| 2006/0252641 | A1 | 11/2006 | Yaghi et al. |
| 2007/0068389 | A1 | 3/2007 | Yaghi |
| 2007/0163663 | A1 * | 7/2007 | Strand ............... B01L 3/502738 137/827 |
| 2007/0180998 | A1 | 8/2007 | Arnold et al. |
| 2007/0202038 | A1 | 8/2007 | Yaghi et al. |
| 2008/0168776 | A1 | 7/2008 | Arnold et al. |
| 2009/0130411 | A1 | 5/2009 | Chang et al. |
| 2009/0139483 | A1 | 6/2009 | Lockledge et al. |
| 2009/0185972 | A1 | 7/2009 | Lee et al. |
| 2009/0283427 | A1 | 11/2009 | Farone |
| 2010/0230298 | A1 | 9/2010 | Biener et al. |
| 2011/0067426 | A1 * | 3/2011 | Hwang ................ F24F 3/1411 62/271 |
| 2011/0100036 | A1 | 5/2011 | Farmer |
| 2011/0224376 | A1 | 9/2011 | Zhai et al. |
| 2012/0028798 | A1 | 2/2012 | Worsley et al. |
| 2013/0283846 | A1 | 10/2013 | Baumann et al. |
| 2014/0060093 | A1 | 3/2014 | Farmer |

FOREIGN PATENT DOCUMENTS

| | | | |
|---|---|---|---|
| WO | WO 2006127652 A2 * | 11/2006 | ...... C10M 175/0058 |
| WO | 2007/038508 A2 | 4/2007 | |
| WO | 2007/130405 A2 | 11/2007 | |
| WO | 2008/118955 A1 | 10/2008 | |
| WO | 2008/140788 A1 | 11/2008 | |
| WO | 2008/154330 A1 | 12/2008 | |
| WO | 2009/020745 A2 | 2/2009 | |
| WO | 2009/020745 A9 | 2/2009 | |
| WO | 2009/114205 A2 | 9/2009 | |

OTHER PUBLICATIONS

Farmer et al., U.S. Appl. No. 12/848,564, filed Aug. 2, 2010.
Farmer et al., U.S. Appl. No. 14/075,170, filed Nov. 8, 2013.
Yaghi et al., "Reticular synthesis and the design of new materials," 2003 Nature Publishing Group, Nature, vol. 423, Jun. 12, 2003, pp. 705-714.
Belmabkhout et al., "Adsorption of CO2-Containing Gas Mixtures over Amine-Bearing Pore-Expanded MCM-41 Silica: Application for Gas Purification," 2010 American Chemical Society, Industrial and Engineering Chemical Research, vol. 49, 2010, pp. 359-365.
Britt et al., "Metal-organic frameworks with high capacity and selectivity for harmful gases," 2008 The National Academy of Sciences of the USA, PNAS, Aug. 19, 2008, vol. 105, No. 33, pp. 11623-11627.
Fletcher et al., "Adsorption Dynamics of Gases and Vapors on the Nanoporous Metal Organic Framework Material Ni2(4,4'-Bipyridine)3(NO3)4: Guest Modification of Host Sorption Behavior," 2001 American Chemical Society, Journal of American Chemical Society, vol. 123, 2001, pp. 10001-10011.
Greathouse et al., "Adsorption and Separaton of Noble Gases by IRMOF-1: Grand Canonical Monte Carlo Simulations," 2009 American Chemical Society, Industrial and Engineering Chemical Research, vol. 48, 2009, pp. 3425-3431.
Henniger et al., "MOFs as Adsorbents for Low Temperature Heating and Cooling Applications," 2009 American Chemical Society, Journal of American Chemical Society, vol. 131, 2009, pp. 2776-2777.
Liang et al., "CO2 Adsorption-Based Separation by Metal Organic Framework (Cu-BTC) versus Zeolite (13X)," 2009 American Chemical Society, Energy & Fuels, vol. 23, 2009, pp. 2785-2789.
Liu et al., "Comparative Molecular Simulation Study of CO2/N2 and CH4/N2 Separation in Zeolites and Metal-Organic Frameworks," 2009 American Chemical Society, Langmuir 2009, vol. 25, No. 10, pp. 5918-5926.
Critoph, R. E., "Performance Limitations of Adsorption Cycles for Solar Cooling," Solar Energy, vol. 41, No. 1, 1988, pp. 21-31.
Teng et al., "Study of the Fundamentals of Adsorption Systems," Applied Thermal Engineering, vol. 17, No. 4, 1997, pp. 327-338.
Meunier, F., "Solid sorption heat powered cycles for cooling and heat pumping applications," Applied Thermal Engineering, vol. 18, 1998, pp. 715-729.
Pons et al., "Adsorptive machines with advanced cycles for heat pumping or cooling applications," International Journal of Refrigeration, vol. 22, 1999, pp. 27-37.
Cheetham et al., "Structural diversity and chemical trends in hybrid inorganic-organic framework materials," Chemical Communications, 2006, pp. 4780-4795.
Arstad et al., "Amine functionalised metal organic frameworks (MOFs) as adsorbents for carbon dioxide," Adsorption, vol. 14, 2008, pp. 755-762.
Babarao et al., "Molecular Simulations for Adsorptive Separation of CO2/CH4 Mixture in Metal-Exposed, Catenated, and Charged Metal-Organic Frameworks," Langmuir, vol. 25, No. 9, 2009, pp. 5239-5247.
Chowdhury et al., "Gas Adsorption Properties of the Chromium-Based Metal Organic Framework MIL-101," Journal of Physical Chemistry C, vol. 113, 2009, pp. 6616-6621.
Chun et al., "Discrimination of Small Gas Molecules through Adsorption: Reverse Selectivity for Hydrogen in a Flexible Metal-Organic Framework," Inorganic Chemistry, vol. 48, 2009, pp. 9980-9982.
Collins et al., "Hydrogen storage in metal-organic frameworks," Journal of Materials Chemistry, vol. 17, 2007, pp. 3154-3160.
Dubbeldam et al., "Method for Analyzing Structural Changes of Flexible Metal-Organic Frameworks Induced by Adsorbates," Journal of Physical Chemistry C, vol. 113, 2009, pp. 19317-19327.
Gallo et al., "Fuel Gas Storage and Separations by Metal-Organic Frameworks: Simulated Adsorption Isotherms for H2 and CH4 and Their Equimolar Mixture," Journal of Physical Chemistry C, vol. 113, 2009, pp. 6634-6642.
Keskin et al., "Testing the Accuracy of Correlations for Multicomponent Mass Transport of Adsorbed Gases in Metal-Organic Frameworks: Diffusion of H2/CH4 Mixtures in CuBTC," Langmuir, vol. 24, 2008, pp. 8254-8261.
Llewellyn et al., "High Uptakes of CO2 and CH4 in Mesoporous Metal-Organic Frameworks MIL-100 and MIL-101," Langmuir, vol. 24, 2008, pp. 7245-7250.
Miller et al., "Single Crystal X-ray Diffraction Studies of Carbon Dioxide and Fuel-Related Gases Adsorbed on the Small Pore Scandium Terephthalate Metal Organic Framework, Sc2(O2CC6H4CO2)3," Langmuir, vol. 25, 2009, pp. 3618-3626.
Park et al., "Stepwise and Hysteretic sorption of N2, O2, CO2, and H2 gases in a porous metal-organic framework [Zn(BPnDC)2(bpy)]," Chemical Communications, vol. 46, 2010, pp. 610-612.
Poirier et al., "On the Nature of the Adsorbed Hydrogen Phase in Microporous Metal-Organic Frameworks at Supercritical Temperatures," Langmuir, vol. 25, No. 20, 2009, pp. 12169-12176.
Sillar et al., "Ab Into Study of Hydrogen Adsorption in MOF-5," Journal of American Chemical Society, vol. 131, 2009, pp. 4143-4150.
Wang, S., "Comparative Molecular Simulation Study of Methane Adsorption in Metal-Organic Frameworks," Energy & Fuels, vol. 21, 2007, pp. 953-956.
Qingyuan et al., "Molecular Simulation of CO2/H2 Mixture Separation in Metal-organic Frameworks: Effect of Catenation and

(56) References Cited

OTHER PUBLICATIONS

Electrostatic Interactions," Thermodynamics and Chemical Engineering Data, Chinese Journal of Chemical Engineering, vol. 17, No. 5, 2009, pp. 781-790.

Yazaydin et al., "Screening of Metal-Organic Frameworks for Carbon Dioxide Capture from Flue Gas Using a Combined Experimental and Modeling Approach," Journal of American Chemical Society, vol. 131, 2009, pp. 18198-18199.

Luo et al., "Thermodynamics of Adsorption Cycles: A Theoretical Study," Heat Transfer Engineering, vol. 13, No. 4, 1992, pp. 19-31.

Sato, Sota, "Development of Hydrogen Storage Material with a Single Nanopore Structure," Synthetic Organic Chemistry, Japan, vol. 66, No. 8, Aug. 2008, pp. 62-63 (non-translated).

Restriction Requirement from U.S. Appl. No. 13/843,761, dated Feb. 9, 2016.

Baumann et al., U.S. Appl. No. 13/843,761, filed Mar. 15, 2013.

Non-Final Office Action from U.S. Appl. No. 13/843,761, dated Aug. 10, 2016.

Non-Final Office Action from U.S. Appl. No. 13/843,761, dated Apr. 5, 2017.

Non-Final Office Action from U.S. Appl. No. 13/843,761, dated Feb. 20, 2018.

Final Office Action from U.S. Appl. No. 13/843,761, dated Nov. 1, 2018.

Examiner's Answer to Appeal Brief from U.S. Appl. No. 13/843,761, dated Aug. 20, 2019.

\* cited by examiner

ADSORPTION COOLING SYSTEM USING METAL ORGANIC FRAMEWORKS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present disclosure relates to metal organic frameworks (MOFs), and particularly, to high-surface area MOFs as adsorbents for adsorptive cooling systems and methods of use thereof.

BACKGROUND

A significant amount of expensive electrical energy is used to air condition and refrigerate commercial and industrial facilities and processes. For example, air conditioning and low temperature refrigeration is estimated to constitute 19% and 9%, respectively, of all electrical energy consumed by commercial buildings. If concentrating solar energy or other waste heat was recaptured or collocated with end use, it could power thermally activated cooling systems and substantially reduce electrical power consumption.

While adsorption-based cooling and refrigeration systems are simple and easy to maintain, today's systems are expensive and relatively inefficient, requiring large footprints and high desorption temperatures. Therefore, it would be beneficial to reduce costs associated with developing, manufacturing, and using highly adsorptive nanoporous materials for adsorptive cooling applications by using MOFs and substrate combinations which improves the adsorption/desorption performance of the structures produced, and enhances the mass-specific stored energy density by using lightweight materials.

Moreover, MOFs have been used in some adsorption cooling applications, such as disclosed in Henninger, et al., *Journal of the American Chemical Society* 131(8), 2776 (2009), where metal organic frameworks were used for adsorption and desorption of water. Although this is an adsorptive cooling system, it is only operative for adsorption cooling via water as an adsorptive cooling material, which limits application of MOFs to water-stable systems. Moreover, the arrangement of MOFs as adsorbent cooling systems may be improved over the conventional systems by increasing accessible surface area for the MOF in the cooling system. Therefore, it would be beneficial to provide an improved adsorptive cooling system employing MOFs and capable of utilizing a variety of heretofore undisclosed refrigerants, as well as providing an adsorptive cooling system employing MOFs to improve adsorptive cooling performance by facilitating ingress and egress of refrigerant to and from the adsorptive MOF.

SUMMARY

In one embodiment, a product includes a highly adsorptive structure, and the highly adsorptive structure includes: a substrate; and a metal-organic framework (MOF) including a plurality of metal atoms coordinated to a plurality of organic spacer molecules; where the MOF is coupled to at least one surface of the substrate, and where the MOF is adapted for adsorbing and desorbing a refrigerant under predetermined thermodynamic conditions.

In another embodiment, an adsorptive cooling system includes: a first highly adsorptive structure positioned to receive thermal energy from a thermal energy source, the first highly adsorptive structure includes: a first substrate; and a first metal-organic framework (MOF) coupled to the first substrate, the first MOF being adapted for adsorbing and desorbing a refrigerant under predetermined thermodynamic conditions. Moreover the adsorptive cooling system includes a second highly adsorptive structure positioned to receive thermal energy from the thermal energy source, the second highly adsorptive structure including: a second substrate; and a second MOF coupled to the second substrate and adapted for adsorbing and desorbing a refrigerant under predetermined thermodynamic conditions. Moreover still the adsorptive cooling system includes a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, where the first and/or second substrate includes a plurality of microchannels, where the microchannels are defined by at least one of grooves in a surface of the substrate and surfaces of a plurality of microcapillaries of the substrate, and where the microchannels provide ingress and egress paths for a refrigerant.

In still another embodiment a method includes forming a MOF on the substrate to produce the product including a highly adsorptive structure, the highly adsorptive structure including: a substrate; and a metal-organic framework (MOF) including a plurality of metal atoms coordinated to a plurality of organic spacer molecules; where the MOF is coupled to at least one surface of the substrate, and where the MOF is adapted for adsorbing and desorbing a refrigerant under predetermined thermodynamic conditions.

Other aspects and embodiments of the present disclosure will become apparent from the following detailed description, which, when taken in conjunction with the drawings, illustrate by way of example the principles of the invention.

DETAILED DESCRIPTION

Figure 1:
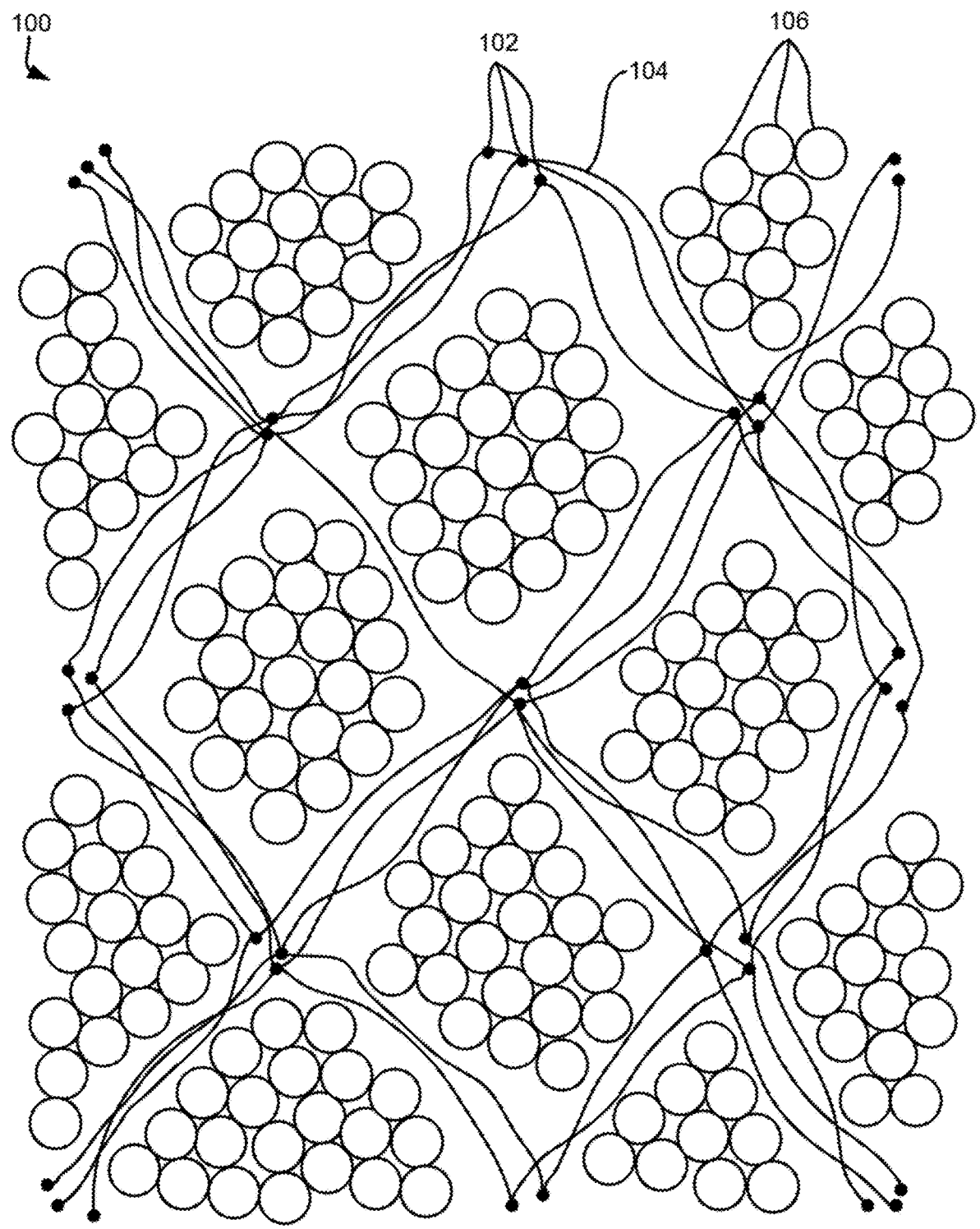
FIG. 1 includes a schematic depiction of a metal organic framework having a plurality of pores and a refrigerant adhered thereto.
Figure 2:
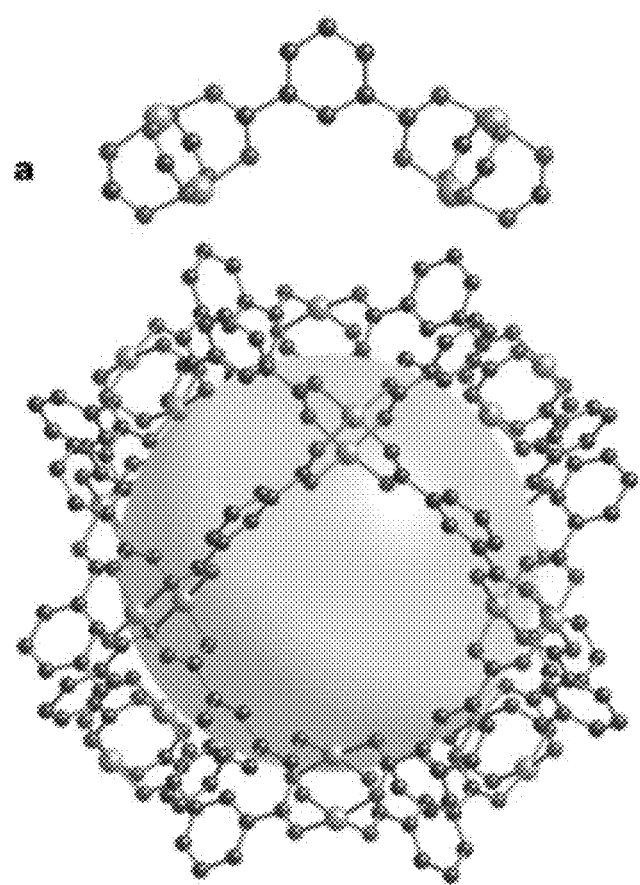
FIG. 2 depicts one of several various possible shapes of MOFs according to illustrative embodiments.
Figure 3:
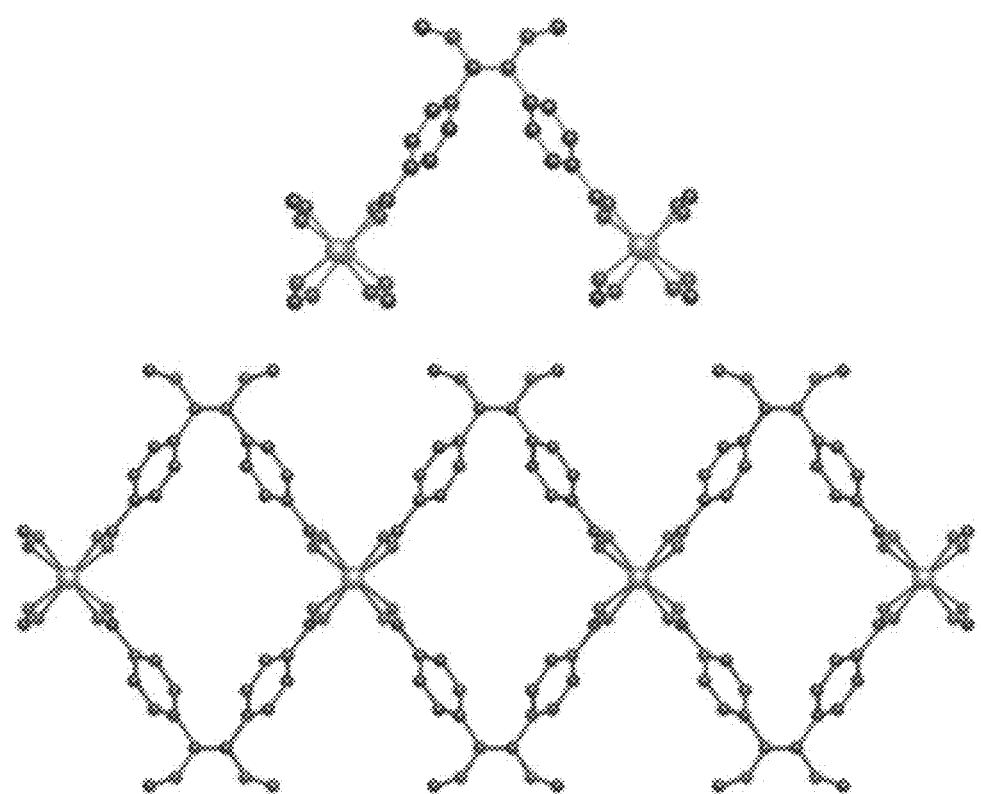
FIG. 3 depicts one of several various possible shapes of MOFs according to illustrative embodiments.
Figure 4:
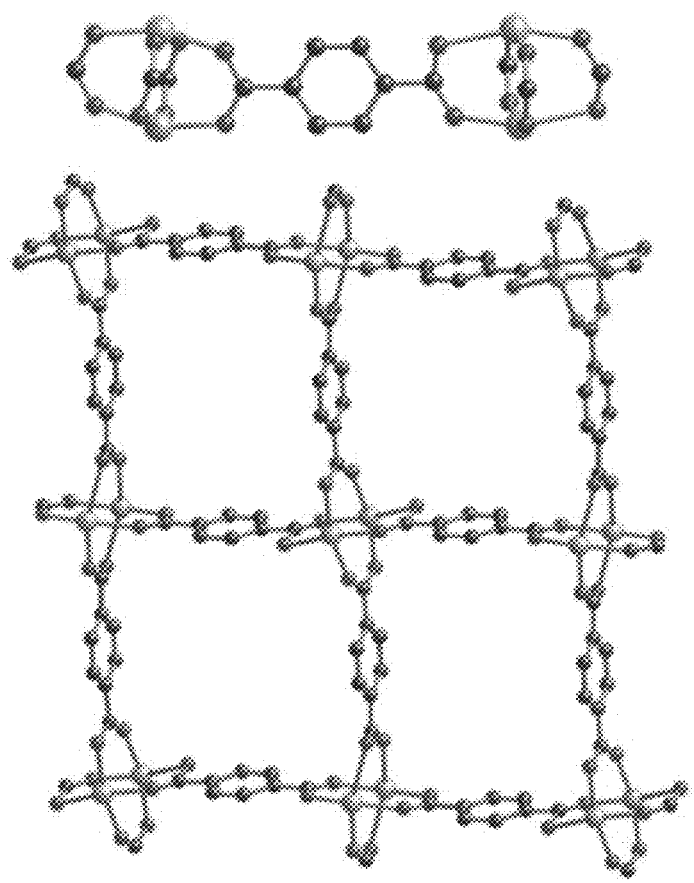
FIG. 4 depicts one of several various possible shapes of MOFs according to illustrative embodiments.
Figure 5:
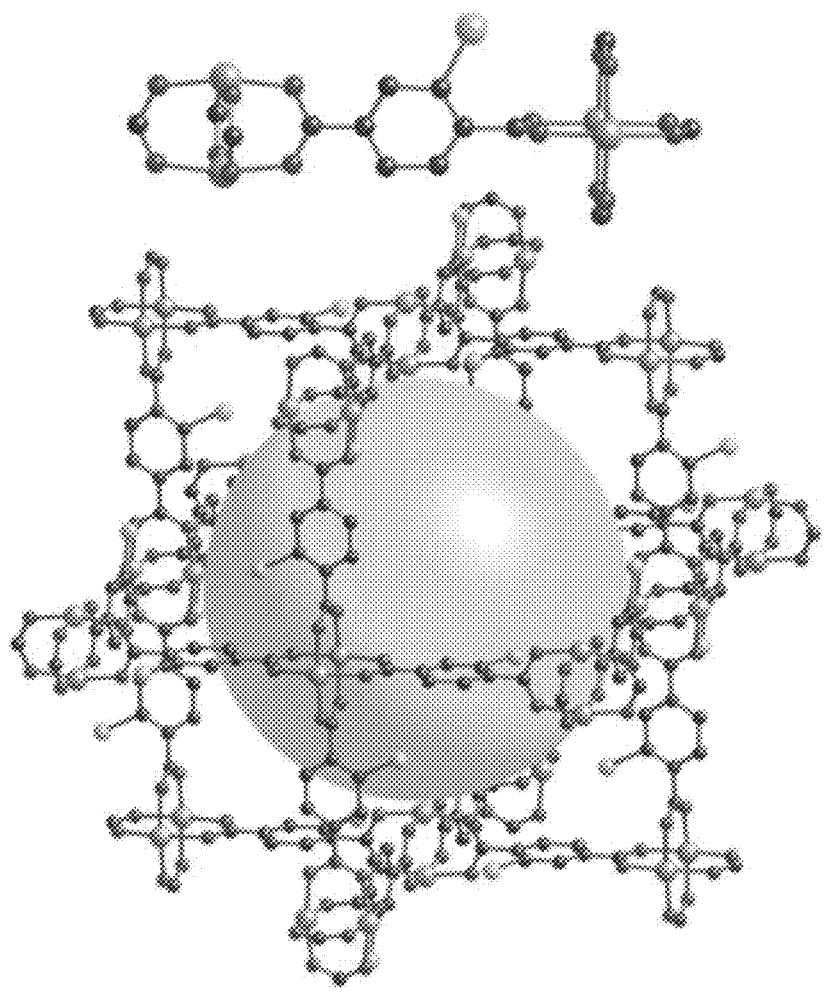
FIG. 5 depicts one of several various possible shapes of MOFs according to illustrative embodiments.

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

In one general embodiment, a product includes a highly adsorptive structure, and the highly adsorptive structure includes: a substrate; and a metal-organic framework (MOF) including a plurality of metal atoms coordinated to a plurality of organic spacer molecules; where the MOF is coupled to at least one surface of the substrate, and where the MOF is adapted for adsorbing and desorbing a refrigerant under predetermined thermodynamic conditions.

In another general embodiment, an adsorptive cooling system includes: a first highly adsorptive structure positioned to receive thermal energy from a thermal energy source, the first highly adsorptive structure includes: a first substrate; and a first metal-organic framework (MOF) coupled to the first substrate, the first MOF being adapted for adsorbing and desorbing a refrigerant under predetermined thermodynamic conditions. Moreover the adsorptive cooling system includes a second highly adsorptive structure positioned to receive thermal energy from the thermal energy source, the second highly adsorptive structure including: a second substrate; and a second MOF coupled to the second substrate and adapted for adsorbing and desorbing a refrigerant under predetermined thermodynamic conditions. Moreover still the adsorptive cooling system includes a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, where the first and/or second substrate includes a plurality of microchannels, where the microchannels are defined by at least one of grooves in a surface of the substrate nearest the MOF and surfaces of a plurality of microcapillaries of the substrate, and where the microchannels provide ingress and egress paths for a refrigerant.

In still another general embodiment a method includes forming a MOF on the substrate to produce the product including a highly adsorptive structure, the highly adsorptive structure including: a substrate; and a metal-organic framework (MOF) including a plurality of metal atoms coordinated to a plurality of organic spacer molecules; where the MOF is coupled to at least one surface of the substrate, and where the MOF is adapted for adsorbing and desorbing a refrigerant under predetermined thermodynamic conditions.

A list of acronyms used in the description is provided below.
AC activated carbon
ADRS solar powered adsorption-desorption refrigeration system
BET Brunauer-Emmett-Teller theory
CFC chlorofluorocarbon
CMMD Condensed Matter and Materials Division (LLNL)
CRADA cooperative research and development agreement
DHS Department of Homeland Security
EDAX energy-dispersive analysis of x rays
EER energy efficiency ratio
ESEM emission scanning electron microscopy
HVAC heating, ventilation, and air conditioning
LLNL Lawrence Livermore National Laboratory
MOF Metal Organic Framework
NREL National Renewable Energy Laboratory
SEER seasonal energy efficiency ratio
T&P temperature and pressure
TEM transmission electron microscopy
UHS ultrahigh surface (metal organic framework)

As used in this application, the term "Retractable Shade" means any light blocking system adapted to selectively block light energy from the sun. For example, the "retractable shade" can alternatively be a lowered shade, a shutter shade, an electronic light blocking system for blocking energy from the sun, or any other system for blocking energy from the sun.

Highly Adsorptive Metal Organic Framework Materials and Methods of Fabrication Metal organic frameworks (MOFs) with extremely high mass-specific surface area (up to about 5000 m$^2$/g) has been investigated for use in some embodiments described herein. MOFs are novel mesoporous materials which combine many interesting properties such as low mass densities, continuous porosities, high surface areas, high electrical conductivities, and excellent mechanical properties. The properties of MOFs are derived from their microstructure, which is typically a network of interconnected primary particles with characteristic diameters of between about 3 nm and about 25 nm, though the dimensions could be higher and/or lower. The material forms macroscopic (for instance, mm-sized) monolithic bodies that support compressive stress and shear stress.

According to some embodiments, the properties of MOFs can be tailored for specific applications by controlling their morphology and/or by adding surface functionalities. The design of new porous MOF materials holds technological promise for a variety of applications, including catalysis, hydrogen storage, and energy storage. The utility of these materials may be derived from their high surface areas, electrically conductive frameworks, and chemical stability. MOFs are a unique class of porous materials that possess ultrafine cell sizes, continuous porosities, and low mass densities. These properties arise from the framework microstructure, a three-dimensional network of primary metal atoms and/or ions interconnected particles with diameters that can range from a few nanometers to several microns The skeletal structure of this material includes interconnected micron-sized organic ligands 104 that define a continuous macroporous network 100 between nodes 102, substantially as shown in FIG. 1, according to one embodiment. This structural motif is likely responsible for the enhanced mechanical integrity of these MOF monoliths, both before and after activation. Despite being macroporous, the pre-activated MOF still exhibits appreciable surface area due to microporosity within the organic ligands. In one embodiment, the network 100 of organic ligands 104 and nodes 102 define a plurality of pores particularly suitable for adsorbing and retaining a fluid such as represented by fluid particles 106 as shown in FIG. 1. Fluids capable of adsorbing to the MOF include any suitable fluid such as a gas or a liquid, and preferably include refrigerant gases in some approaches. In particularly preferred approaches, the fluid particles 106 may be selected from a group as laid out below in Tables 1 and 2.

Figure 6:
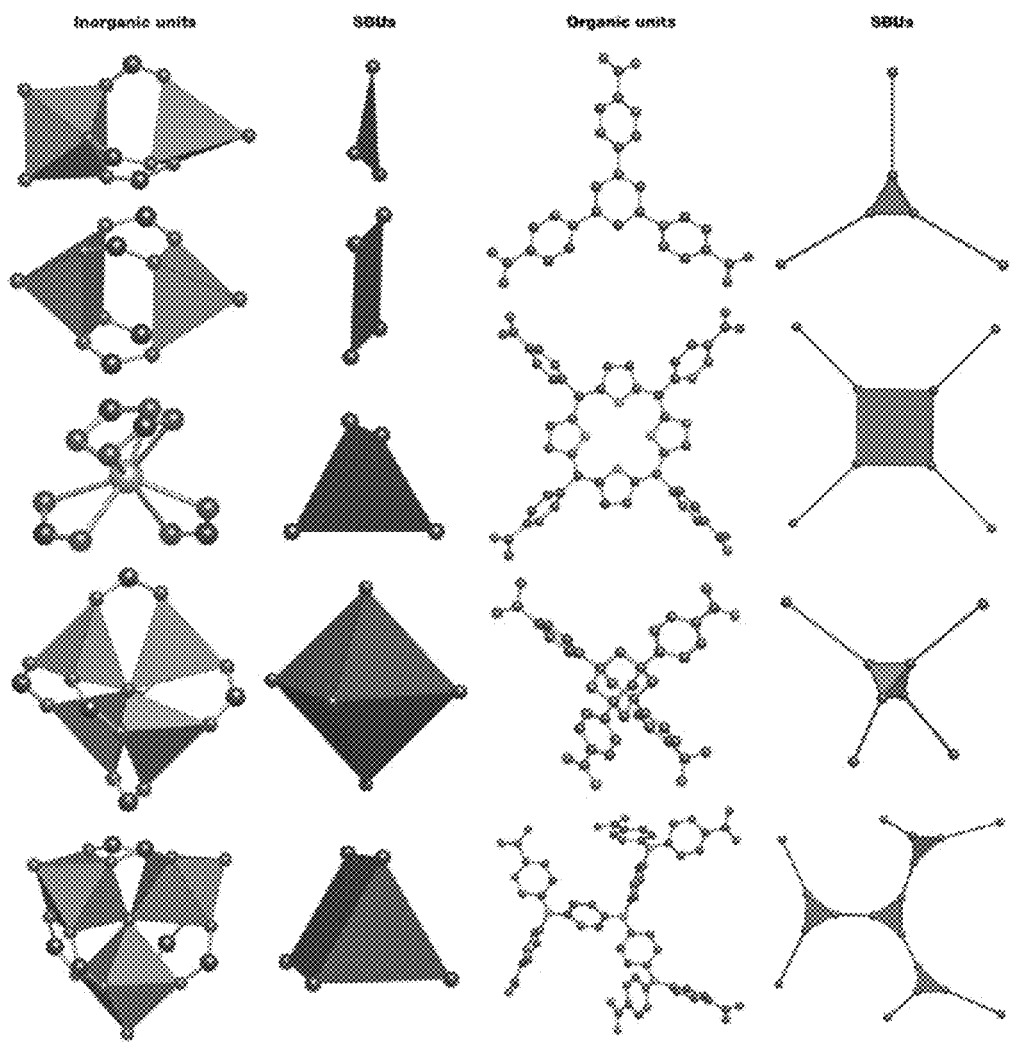
FIG. 6 depicts several examples of building units for MOFs, according to one embodiment.

Of course, MOFs may be constructed to produce a variety of forms, such as several exemplary embodiments as shown in FIGS. 2-5. Moreover, MOFs may be constructed from a plurality of small building units (SBUs) such as depicted in FIG. 6, in some approaches.

In some approaches, the metal organic framework may have a mass-specific surface area of greater than about 5000 m$^2$/g.

In more approaches, the metal organic framework may include a network of interconnected primary particles, the primary particle having a characteristic diameter of between about 3 mm and about 25 nm. In further approaches, the characteristic diameter may be between about 3-10 nm, between about 5-15 nm, between about 12-25 nm, between about 5-20 nm, etc. as would be understood by one having ordinary skill in the art upon reading the present descriptions.

In one embodiment, a highly adsorptive structure includes a substrate and a metal organic framework adhered to the substrate, wherein the metal organic may be formed on the substrate includes any formation process where a metal organic framework is formed directly on the substrate surface from constituent metal organic framework components as described above.

Moreover, in various approaches the MOF is adapted for adsorbing and desorbing a refrigerant under predetermined thermodynamic conditions. As understood herein, thermodynamic conditions include pressure and temperature. Preferably, adsorption/desorption temperatures should be relatively low, e.g. less than 90° C. in some embodiments. As will be understood by one having ordinary skill in the art upon reading the present descriptions, favorable thermodynamic conditions for adsorption/desorption depend on the particular combination of MOF and refrigerant being employed.

In more approaches, the predetermined thermodynamic conditions are based on an identity of each of: the plurality of metal atoms, the plurality of organic spacer molecules, and the refrigerant. In particular, thermodynamic conditions for adsorption/desorption are generally a function of the organic spacer and metal ions employed. Specific combinations may be chosen to tailor different systems to individual refrigerants and/or operating conditions as would be understood by the skilled artisan reading the present descriptions.

Moreover still, in additional approaches, the MOF is characterized by a pore structure, wherein the pore structure is determined based on an identity of each of: the plurality of metal atoms and the plurality of organic spacer molecules. In particular, and as would be understood by one having ordinary skill in the art upon reading the present descriptions, pore size and structure, akin to thermodynamic conditions for adsorption/desorption, may be tailored to individual MOF/refrigerant combos by selecting particular combinations of organic spacer and metal atom or ion.

Suitable refrigerants for adsorptive cooling systems as described herein include, but are not limited to: methyl silane, propylene, propane, propadiene, ammonia, cyclopropane, dimethyl ether, methyl acetylene, methyl phosphine, bromo difluoro nitroso methane, methyl nitrate, isobutene, isobutylene, 1-butene, amino methane, 1,3 butadiene, butane, trans 2-butene, trimethyl amine, cis 2-butene, 1-butene-3-one, vinyl acetylene, methane thiol, fulvene, 1-butyne, neopentane, butadiyne, methylallene, cyclobutane, acetaldehyde, methanol, cycloneptane, chloro trifluoro methane, trifluoro acetonitrile, methylene fluoroide, 3,3,3-trifluoropropyne, 1,1,1 trifluoroethane, nitroso-pentafluoro ethane, chloro difluoro methane, chloro pentafluoro ethane, fluoroethane, perfluordimethyl amine, perfluoropropane, perfluoro ethyl amine, trifluoro methyl peroxide, nitro trifluoro methane, dichloro difluoro methane, perfluoro propylene, 1,1,1,2 tetrafluoro ethane, trifluoro methyl phosphine, 1,1 difluoro ethane, perfluoro 2-butyne, methyl chloride, fluoro formaldehyde, iodo trifluoro methane, trifluoromethyl sulfide, trifluoro methane sulfonyl fluoride, pentafluoro thio trifluoro methane, vinyl chloride, 1-nitroso heptafluoro propane, trifluoro ethoxyl silane, hexafluorodimethylamine, ethyl trifluoro silane, perfluoro cyclobutane, 3-fluoropropylene, perfluoro methyl mercaptan, 2,2, difluoro propane, nitro pentafluoro ethane, perfluoro 2-butene, trans 2-butane, 1,1,1,2,2,3 hexafluoro propane, perfluoro cyclobutene, methyl bromide, bromoacetylene, pentachloro benzyl chloride, hexafluoro 1,3 butadiene, 2-chloro 1,1,1 trifluoroethane, dichloro fluoro methane, 2-fluoro 1,3-butadiene, acetyl fluoride, 1,2 dichloro 1,2 difluoro ethylene, 1-nitro heptafluoro propane, and neopentyl chloride, etc. as would be understood by one having ordinary skill in the art upon reading the present descriptions.

In more embodiments, the substrate may include a plurality of microchannels adapted for interfacing with a metal organic framework. Moreover, according to such embodiments the metal organic framework may be adhered to an interior and/or an exterior surface of one or more of the plurality of microchannels. As will be understood by one having ordinary skill in the art upon reading the present descriptions, a substrate having a plurality of microchannels increases available surface area for metal organic framework binding and thus improves the overall adsorption/desorption performance of an adsorptive cooling system employing a highly adsorptive structure such as the inventive metal organic framework disposed on a substrate surface having a plurality of microchannels as described herein. Moreover, the increased surface area provides improved cooling capacity to such systems as compared to typical adsorptive cooling systems employing a metal organic framework monolith positioned within a canister-type container substantially as described in U.S. patent application Ser. No. 12/848,564 to Farmer, et al.

In still more embodiments, the metal organic framework may have an exterior surface substantially conformal to the substrate positioned adjacent thereto. As will be appreciated by one having ordinary skill in the art upon reading the present descriptions, formation of a monolithic structure results in the monolith taking a form substantially conformal to that of the substrate in and/or on which formation occurs.

In even more embodiments, the highly adsorptive structures described herein may be characterized such that the substrate includes a plurality of microchannels. As understood herein, microchannels may constitute any suitable microstructure which increases surface area of a substrate upon which the microchannels are arranged. For example, in some approaches microchannels in the substrate may include a plurality of etches, grooves, microcapillaries, ridges, etc. as would be understood by one having ordinary skill in the art upon reading the present descriptions. Moreover, according to such embodiments the metal organic framework may be adhered to an interior and/or exterior surface of the plurality of microchannels.

Figure 15A:
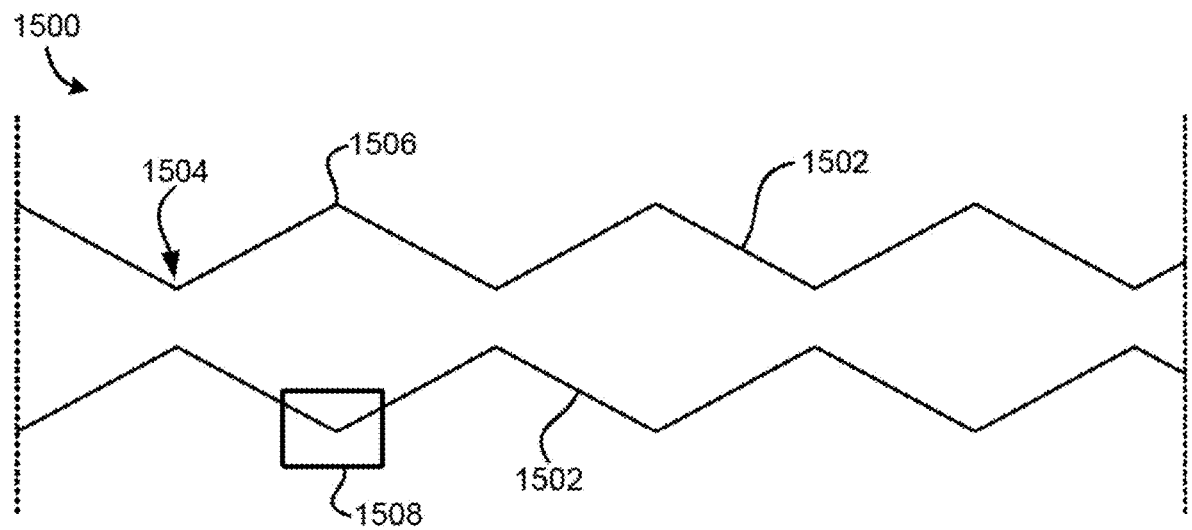
FIG. 15A illustrates a substrate having a corrugated surface, according to one embodiment
Figure 15B:
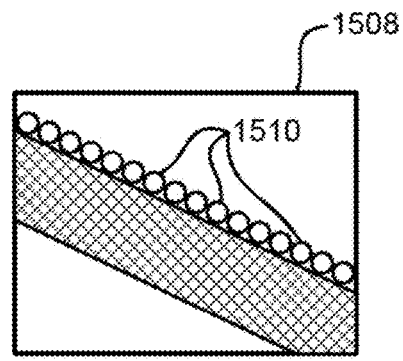
FIG. 15B illustrates a substrate having a plurality of microchannels arranged along a surface of the substrate, according to one embodiment.
Figure 15C:
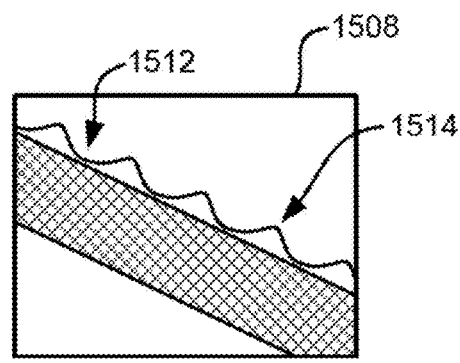
FIG. 15C illustrates a substrate having a plurality of microchannels arranged along a surface of the substrate, according to one embodiment.

As will be understood by one having ordinary skill in the art, adherence to an interior and/or exterior surface of the plurality of microchannels encompasses any binding of metal organic framework to any portion of the interior surface of the microchannel (e.g. the interior of microcapillaries 1510 as shown in FIG. 15B; a valley of a groove such as valley 1512 of FIG. 15C, etc. as would be understood by one having ordinary skill in the art upon reading the present descriptions.) Similarly, adherence to an interior and/or exterior surface of the plurality of microchannels encompasses any binding of metal organic framework to any portion of the exterior surface includes binding to the outer surface of microcapillaries 1510 as shown in FIG. 15B, as well as binding to a peak of a microchannel groove such as peak 1514 as shown in FIG. 15C.

Moreover, in many approaches the microchannels may improve overall surface area and thus adsorptive cooling potential of a structure employing a highly adsorptive structure as described herein. Such improvements may be further attributed at least in part to the fact that the microchannels provide ingress and egress paths for ambient gases, e.g. a refrigerant gas for an adsorptive cooling system. Of course, the microchannels may provide ingress and egress paths for fluids other than gases, as would be understood by the skilled artisan reading the present descriptions.

Moreover still, in some approaches the metal organic framework may be biased toward the substrate for increasing a thermal conductivity between the metal organic framework and the substrate. Surprisingly, improvements to thermal conductivity are achievable without the use of a conductive paste as is typically required.

The highly adsorptive structure as described herein may further include a refrigerant adsorbed to the metal organic framework in some approaches. In preferred embodiments, the refrigerant desorbs from the metal organic framework at a temperature of less than about 90° C.

In still more embodiments, the highly adsorptive structure may have an enclosing container having an opening configured for ingress and egress, e.g. of a refrigerant. In such embodiments, the enclosing container may be further adapted for integration with a circulation system, e.g. a circulation system adapted for circulating the refrigerant to and from the highly adsorptive structure.

Methods of Fabrication

As described herein, the inventive metal organic framework and substrate product may be fabricated according to the following process.

According to some approaches, MOFs may be prepared substantially as disclosed in Yaghi, et al., *Nature* 423, 705 (2003). MOFs may be fabricated in a variety of forms, including monoliths and thin films, a feature that can be advantageous for many applications.

The structure-property relationships of MOFs are largely determined by the species of metal atom and organic spacer forming the framework.

Figure 16A:
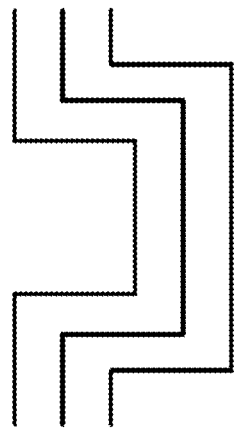
FIG. 16A shows one arrangement for a plurality of microchannels arranged along a surface of the substrate, according to one embodiment.
Figure 16B:
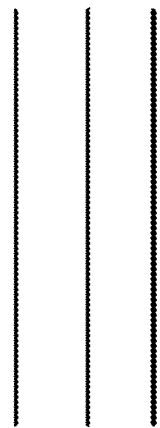
FIG. 16B shows one arrangement for a plurality of microchannels arranged along a surface of the substrate, according to one embodiment.
Figure 16C:
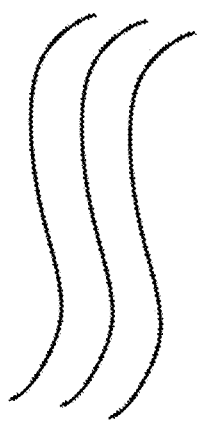
FIG. 16C shows one arrangement for a plurality of microchannels arranged along a surface of the substrate, according to one embodiment.
Figure 16D:
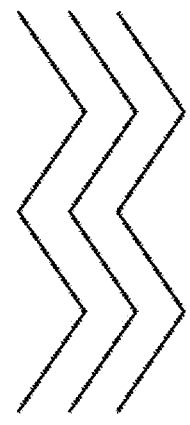
FIG. 16D shows one arrangement for a plurality of microchannels arranged along a surface of the substrate, according to one embodiment.
Figure 17:
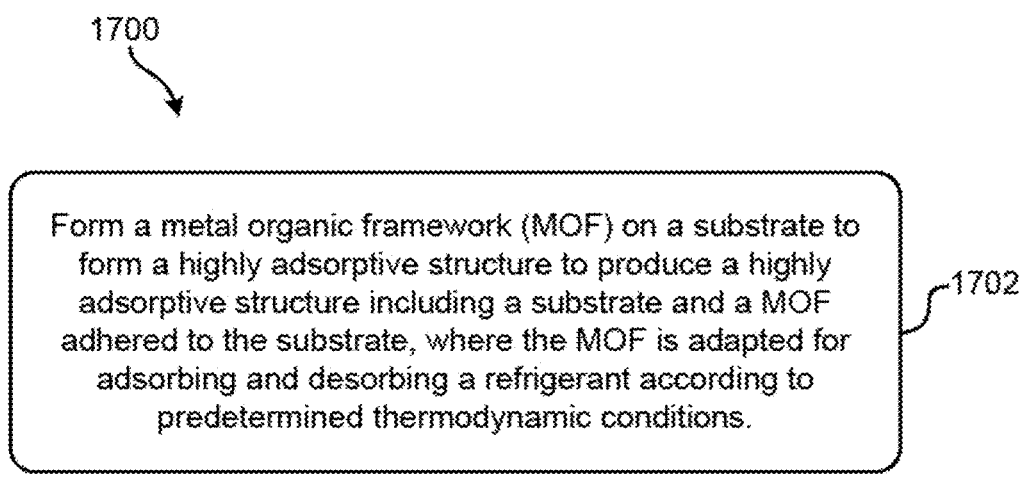
FIG. 17 shows a flowchart of a method, according to one embodiment.

Referring now to FIG. 17 a method 1700 is shown, according to one embodiment. As described herein, the method 1700 may be implemented in any suitable environment, including those depicted in FIGS. 1-16, among others.

As shown in FIG. 17 the method 1700 initiates with operation 1702, where a metal organic framework is formed on a substrate to produce a highly adsorptive structure including a substrate; and a metal organic framework adhered to the substrate, where the metal organic framework is adapted for adsorbing and desorbing a refrigerant according to predetermined thermodynamic conditions.

In some approaches, the substrate includes a plurality of microchannels such as grooves, etches, ridges, microcapillaries, etc. as would be understood by one having ordinary skill in the art upon reading the present descriptions.

Adsorptive Cooling System Utilizing Highly Adsorptive Metal Organic Framework Materials The present disclosure provides a thermally controlled adsorption-desorption refrigeration and air conditioning system that uses nanostructural materials such as metal organic frameworks as the adsorptive media. As disclosed herein, refrigerant molecules may be adsorbed on the high surface area of the nanostructural material while the material is at a relatively low temperature, perhaps at night. During daylight hours, when the nanostructural materials are heated by thermal energy, the refrigerant molecules may be thermally desorbed from the surface of the MOF, thereby creating a pressurized gas phase in the vessel that contains the MOF in some approaches. This thermally controlled pressurization may force the heated gaseous refrigerant through a condenser, followed by an expansion valve. In the condenser, heat may be removed from the refrigerant, first by circulating air or water. Eventually, the cooled gaseous refrigerant may expand isenthalpically through a throttle valve into an evaporator.

In one embodiment, the present disclosure provides a thermally controlled adsorption-desorption refrigeration system. During Phase 1, incident thermal radiation may cause heating of the first bed of high specific surface area adsorption media (Bed A), which then may cause thermal desorption of the refrigerant in one approach. Refrigerant desorption may increase the gas-phase pressure in the pores of the adsorption media, thereby forcing the gaseous refrigerant to flow out of the adsorption bed, through a two-stage condenser. While passing through the two-stage condenser, heat may be first removed from the hot gaseous refrigerant by a stream of water that eventually flows into a hot water heater and storage system in another approach. Then, the refrigerant may be further cooled by chilled refrigerant leaving the evaporator after vaporization. After passing through the two-stage condenser, the gaseous refrigerant may undergo expansion, e.g. isenthalpic expansion, through an expansion valve in yet another embodiment. A portion of the refrigerant may condense in the evaporator, while some of the refrigerant may be flashed, such that some of the refrigerant may change state from a liquid to a gas while absorbing heat from the remaining liquid refrigerant, and exit the evaporator. The evaporator may absorb heat from the room or area being cooled, which may result in further vaporization of the refrigerant. Further, in another embodiment, the cool, vaporized refrigerant may then leave the evaporator, passing through tubes in the shell-and-tube heat exchanger comprising the second stage of the two-stage condenser. Once leaving the tube-side of this heat exchanger, the cool, vaporized refrigerant may flow to the second bed of adsorption media (Bed B), which may be maintained at a lower temperature than the first bed in some approaches. Moreover, in some embodiments, the entire system may be allowed to cool at relatively cool ambient temperatures, e.g. at night, and most of the refrigerant may adsorb on the second adsorption bed (Bed B). During the second phase, the refrigeration cycle may be reversed, with thermal desorption from Bed B and adsorption on the cooler Bed A in some approaches.

Systems and methods in accordance with the present disclosure may be used for various purposes, including but not limited to climate control. Additionally, the present disclosure may be used for cooling homes and commercial buildings; cooling passenger compartments in various vehicles, including cars, trucks, commercial ships, and airplanes; cooling of high performance computing machines and electronics; cooling advanced energy conversion and storage devices, including batteries; cooling office buildings and laboratories; cooling passenger compartments in military vehicles including trucks, tanks, armored personnel carriers, naval ships, submarines, airplanes, and spacecrafts; and for cooling other structures, devices, vehicles, etc. as would be understood by one having ordinary skill in the art upon reading the present disclosure.

The system as disclosed herein may also be used in other appliances, including, but not limited to, hot water heaters, heaters, etc. and other such appliances as would be understood by one having ordinary skill in the art upon reading the present disclosure.

Figure 7:
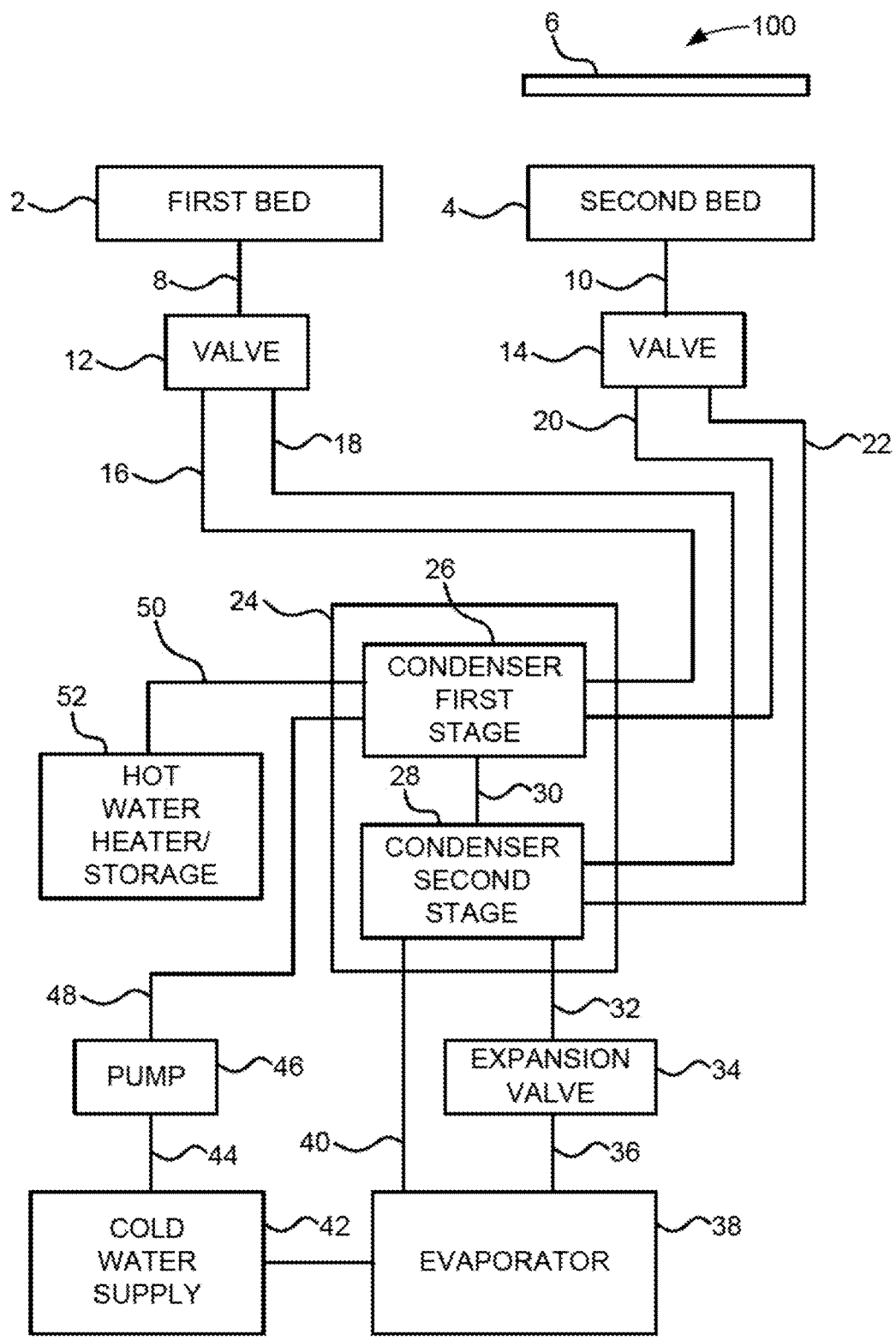
FIG. 7 illustrates one embodiment of an adsorption-desorption refrigeration system (ADRS) constructed in accordance with the present descriptions, according to one embodiment.

Several embodiments of an adsorption-desorption refrigeration system (ADRS) constructed in accordance with the present disclosure are illustrated in FIGS. 7-14. For example, FIG. 7 illustrates one embodiment of a thermally controlled adsorption-desorption refrigeration system of the present disclosure. The thermally controlled adsorption-desorption refrigeration system may be designated generally by the reference numeral 1400. Reference numerals may be used to designate various components, systems, units, devices which are generally referred to below as "item(s)" in FIGS. 7-14.

As shown in FIG. 7, item 2 may be a first bed of high specific surface area adsorption media, including, but not limited to, a nanostructural foam, MOF based media, etc. and other high specific surface area adsorption media as would be understood by one having ordinary skill in the art upon reading the present disclosure. In another embodiment, item 4 may be a second bed with the same properties of the first bed item 2. In yet another embodiment, item 6 may be a retractable sun shade that may be moved to cover or uncover either beds 2 or 4 or may be positioned to uncover both beds 2 and 4 at the same tune. The beds of high specific surface area adsorption media, item 2 and item 6, may be any nanostructural material, including, but not limited to, an MOF, a sol gel, a zeolite, etc. or any other nanostructural material as would be understood by one having ordinary skill in the art upon reading the present disclosure.

In one embodiment, item 2 may be any light blocking system adapted to selectively block energy from a thermal energy source, such as the sun, a heating element, waste heat, etc. or any other thermal energy source as would be understood by one having ordinary skill in the art upon reading the present disclosure. For example, item 2 may include, but is not limited to, a louvered shade, a shutter shade, an electronic light blocking system for blocking energy from a thermal energy source, etc. or any other system for blocking thermal energy as would be understood by one having ordinary skill in the art upon reading the present disclosure.

As shown in FIG. 7, item 12 may be a two-way valve that connects the first bed 2 to the two-stage condenser 24 in one approach. Item 16 may be a line that connects valve 12 to the condenser first stage 26 of the two-stage condenser in another approach. In yet another embodiment, item 18 may be another line that connects valve 12 to the second stage 28 of the two-stage condenser. Moreover, in one approach line 30 may connect the condenser first stage to the condenser second stage. Additionally, item 32 may be a line connecting the two-stage condenser to the expansion valve 34 and item 36 may connect the expansion valve 34 to the evaporator 38 in another approach. In yet another embodiment, item 40 may be a line connecting the evaporator 38 to the condenser second stage.

Item 10 as shown in FIG. 7 may be a line connecting the second bed 4 to a two-way valve 14 in one approach. In another approach, item 20 may be a line that connects valve 14 to the condenser first stage 26 and item 22 may be a line connecting valve 14 to the condenser second stage 28. Further, in one embodiment, item 42 may be a cold water supply, including, but not limited to, tap water entering a building, or other cold water supply as would be understood by one having ordinary skill in the art. Moreover, in another approach, item 44 may be a line connecting the cold water supply 42 to a pump 46 that through line 48 may connect to condenser first stage 26. Item 50 may be a line that connects condenser first stage 26 to a hot water heater/storage module 52 in yet another approach.

Figure 8:
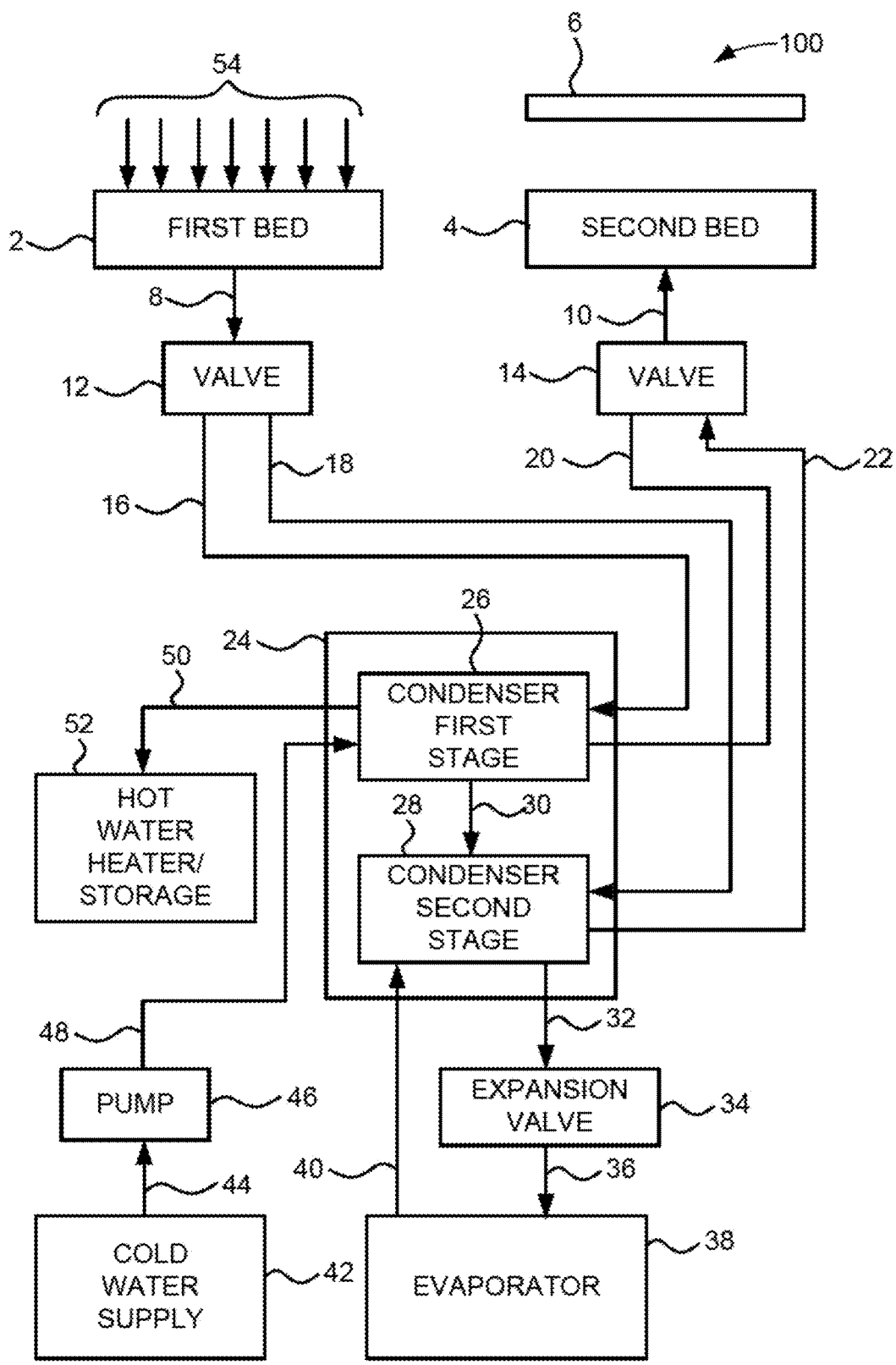
FIG. 8 illustrates phase 1 of the (ADRS), according to one embodiment.

FIG. 8 illustrates one embodiment of phase 1 of the ADRS. The thermally controlled adsorption-desorption refrigeration system (ADRS) may be designated generally by the reference numeral 100. Incident thermal energy 54 may cause heating of the first bed 2, which, in turn, may cause thermal desorption of the refrigerant stored in bed 2 in one approach. Refrigerant desorption may increase the gas phase pressure in the pores of the adsorption media, and may thereby force the gaseous refrigerant (GS) to flow-out of the first bed 2. The GS may flow through line 8 to the two-way valve 12 and from there through line 16 to the condenser first stage 26 of two-stage condenser 24 in another approach. In the condenser first stage 26, heat may be removed from the GS by a stream of cold water supplied by cold water supply 42 and pump 46 in yet another approach.

As shown in FIG. 8, after removing heat from the GS, the warmed water may exit the condenser first stage by line 50 and may be stored in hot water storage module 52 according to one approach. This hot water may be used for other purposes in whatever structure the ADRS may be used. In another embodiment, the cooled GS may now enter, through line 30, the condenser second stage 28 where the GS may be further cooled by the chilled refrigerant leaving the evaporator 38 after vaporization. After passing through the two-stage condenser 24, the GS may undergo isenthalpic expansion in the expansion valve 34 in yet another embodiment.

Additionally, in one embodiment, a portion of the GS may condense in the evaporator 38 while some of the GS may be flashed (chilled refrigerant) and may exit the evaporator 38 as shown in FIG. 8. The evaporator 38 may absorb heat from the room or area being cooled, which may result in further vaporization of the GS. In another approach, the chilled vaporized GS may exit the evaporator 38 and through line 40 may enter the condenser second stage and may proceed through the tubes of a shell-and-tube heat exchanger, which comprises the condenser second stage 28 of the two-stage condenser 24. The GS may leave the condenser by way of line 22 and may pass through valve 14 and line 10 may be deposited in the-adsorption media of bed 4, which is at a lower temperature than the first bed 2 in yet another approach.

Figure 9:
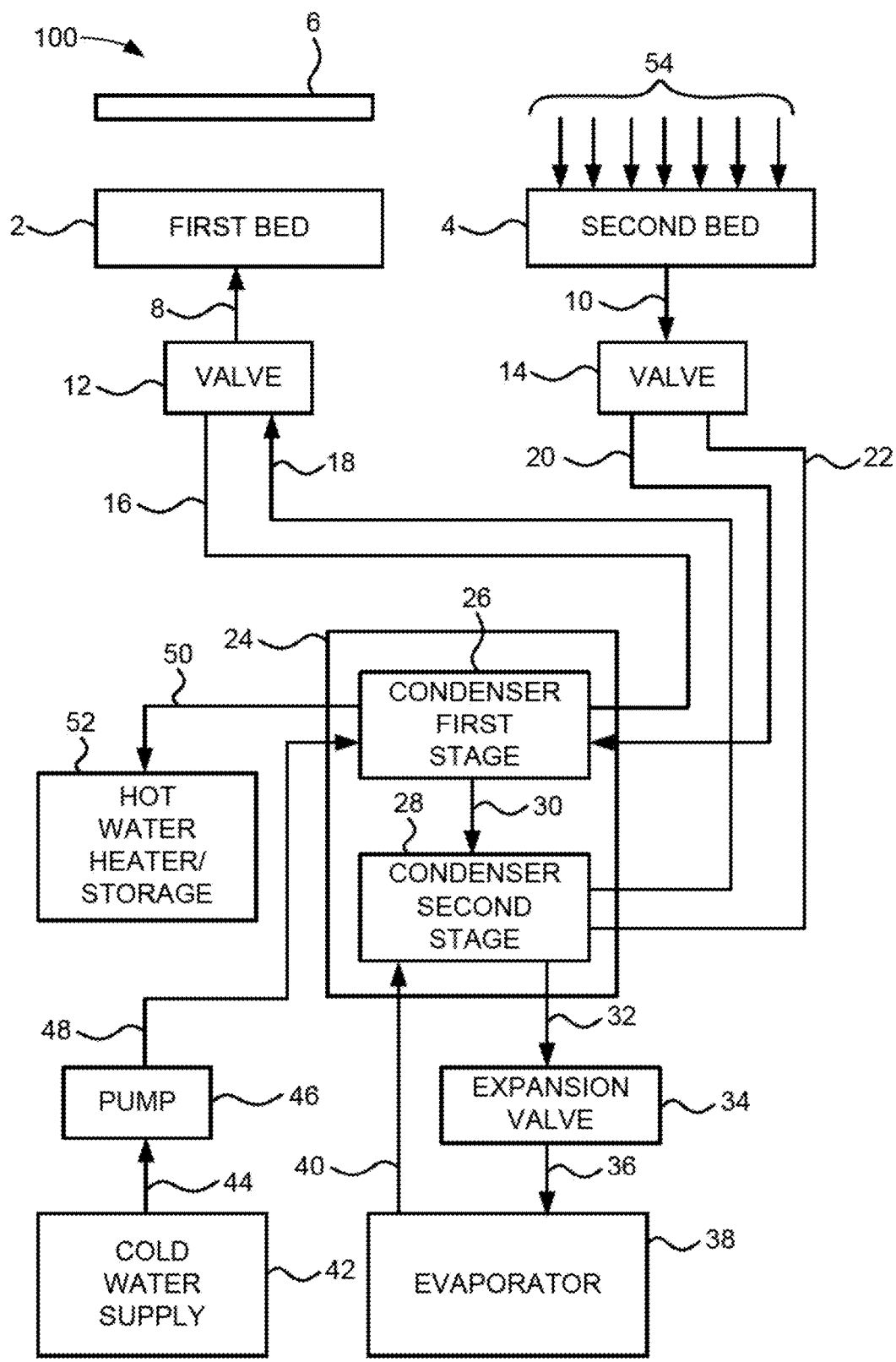
FIG. 9 illustrates phase 2 of the (ADRS), according to one embodiment.

FIG. 9 illustrates one embodiment of the second phase of the refrigeration cycle. During phase two, the second bed 4 may receive the thermal energy 54 and may heat the GS, which may flow through the ADRS in the reverse order and may end up adsorbed in bed 2, which is at a cooler temperature. This cycling between bed 2 and 4 may take place several times during a day depending on the size of the ADRS in some approaches. Some suitable examples of Non-Halogenated compounds with boiling points appropriate for use as refrigerants are tabulated in Table 1.

TABLE 1

| Name | Formula | FW | BP (° C.) | MP (° C.) | Density (g/cc) |
|---|---|---|---|---|---|
| carbon dioxide | CO2 | 44.0000 | −78.6000 | −56.6000 | 1.0310 |
| methyl silane | CH3SiH3 | 46.1200 | −57.0000 | −156.5000 | |
| propene or propylene | CH3CHCH2 | 42.0800 | −47.4000 | −185.2000 | 0.5193 |
| propane | CH3CH2CH3 | 44.1100 | −42.1000 | −189.7000 | 0.5831 |
| propadiene or allene | ClH2CCH2 | 40.0700 | −34.5000 | −136.0000 | 0.7870 |
| ammonia | NH3 | 17.0300 | −33.3500 | −77.7000 | 0.7710 |
| cyclopropane | C3H8 | 42.0800 | −32.7000 | −127.6000 | 0.7200 |
| dimethyl ether | CH3OCH3 | 46.0700 | −25.0000 | −138.5000 | |
| methyl acertylene or propyne | CH3CCH | 40.0700 | −23.2000 | −105.5000 | 0.7062 |
| methyl phospine | CH3PH3 | 48.0600 | −14.0000 | | |
| vinyl chloride or chloroethylene | CH2CHCl | 62.0500 | −13.4000 | −153.8000 | 0.9106 |
| bromo difluoro nitroso methane | BrF2CNO | 159.9200 | −12.0000 | | |
| methyl nitrate | CH3ONO | 61.0400 | −12.0000 | −16.0000 | 0.9910 |
| isobutane | (CH3)2CHCH2 | 58.1200 | −11.7000 | −159.4000 | 0.5490 |
| isobutylene | (CH3)2CCH2 | 56.1100 | −6.9000 | −140.3000 | 0.5942 |
| 1-butene | CH3CH2CHCH3 | 56.1200 | −6.3000 | −185.3000 | 0.5951 |
| amino methane | CH3NH2 | 31.0600 | −6.3000 | −93.5000 | 0.6628 |
| 1,3 butadiene or bivinyl | CH2C2H2CH2 | 54.0900 | −4.4000 | −108.9000 | 0.6211 |
| butane | C4H10 | 58.1200 | −0.5000 | −138.4000 | 0.6012 |
| trans 2-butene | CH3CHCHCH3 | 56.1200 | 0.9000 | −105.5000 | 0.6042 |
| trimethyl amine | (CH3)3N | 59.1100 | 2.9000 | −117.2000 | 0.6356 |
| cis 2-butene | CH3CHCHCH3 | 56.1200 | 3.7000 | −138.9000 | 0.6213 |
| 1-butene-3-one | CH2CHCCH | 52.0800 | 5.1000 | | 0.7095 |
| vinyl acetylene | CH2CHCCH | 52.0800 | 5.1000 | | 0.7095 |
| methane thiol | CH3SH | 48.1100 | 6.2000 | −123.0000 | 0.8665 |
| fulwene | C6H6 | 78.1100 | 7.0000 | | |
| 1-butyne | CH3CHCCH | 54.0900 | 8.1000 | −125.7000 | 0.6784 |
| neopentane | (CH3)4C | 72.1500 | 9.5000 | −16.5000 | 0.6135 |
| butadiyne | CHCCCH | 50.0600 | 10.3000 | −36.4000 | 0.7634 |
| 1,2 butadiene or methylallene | CH2CCHCH3 | 54.0900 | 10.8000 | −136.2000 | 0.6760 |
| cyclobutane | C4H8 | 56.1200 | 12.0000 | −50.0000 | 1.0457 |
| acetaaldehyde | CH3CHO | 44.0500 | 20.8000 | −121.0000 | 0.7834 |
| methanol | CH3OH | 32.0400 | 65.0000 | −93.9000 | 0.7914 |
| cycloneptane | C7H14 | 98.1900 | 118.5000 | −12.0000 | 0.8098 |

Some suitable examples of halogenated compounds with boiling points appropriate for use as refrigerants are tabulated in Table 2.

TABLE 2

| Name | Formula | FW | BP (° C.) | MP (° C.) | Density (g/cc) |
|---|---|---|---|---|---|
| chloro trifluoro methane or Freon 13 | ClCF3 | 104.4600 | −81.1000 | −181.000 | |
| trifluoro acetonitrile | F3CCN | 95.0300 | −64.0000 | | |
| methylene fluoroide | CHF2 | 52.0200 | −51.6000 | | 0.9090 |
| 3,3,3-trifluoropropyne | F3CCCH | 94.0400 | −48.3000 | | |

TABLE 2-continued

| Name | Formula | FW | BP (° C.) | MP (° C.) | Density (g/cc) |
|---|---|---|---|---|---|
| 1,1,1 trifluoroethane | CH3CF3 | 84.0400 | −47.3000 | −111.3000 | |
| nitroso-pentafluoro ethane | CF3CF2NO | 149.0200 | −42.0000 | | |
| chloroo difluoro methane or Freon 22 | ClCHF3 | 86.4700 | −40.8000 | −146.0000 | |
| chloro pentafluoro ethane | ClCF2CF3 | 154.4700 | −38.0000 | −106.0000 | |
| fluoroethane | CH3CH2F | 48.0600 | −37.7000 | −143.2000 | 0.7182 |
| perfluorodimethyl amine | (CH3)2NF | 171.0200 | −37.0000 | | |
| perfluoropropane | C3F8 | 188.0200 | −36.0000 | −183.0000 | |
| perfluoro ethyl amine | CF3CF2NF2 | 171$$02 | −35.0000 | | |
| trifluoro methyl peroxide | CF3OOCF3 | 170.0100 | −32.0000 | | |
| nitro trifluoro methane | F3CNO2 | 115.0100 | −31.1000 | | |
| dichloro difluoro methane or Freon 12 | Cl2CF2 | 120.9100 | −29.8000 | −158.0000 | 1.1834 |
| perfluoro propylene | CF3CFCF2 | 150.0200 | −29.4000 | −156.2000 | 1.5830 |
| 1,1,1,2 tetrafluoro ethane | CH3FCF3 | 102.0300 | −26.5000 | | |
| trifluoro methyl phosphine | F3COH2 | 102.0000 | −26.5000 | | |
| 1,1 difluoro ethane | CH3CHF2 | 66.0500 | −24.7000 | −117.0000 | 0.9500 |
| perfluoro 2-butyne | CF3CCCF3 | 162.0400 | −24.6000 | −117.4000 | |
| methyl chloride | CH3Cl | 50.4900 | −24.2000 | −97.1000 | 0.9159 |
| fluoro formaldehyde | FCHO | 48.0000 | −24.0000 | | |
| iodo trifluoro methane | CF3I | 195.9100 | −22.5000 | | 2.3608 |
| trifluoromethyl sulfide | (CF3)2S | 170.0800 | −22.2000 | | |
| trifluoro methane sulfonyl fluoride | F3CSO2F | 152.0700 | −21.7000 | | |
| pentafluoro thio trifluoro methane | F3C(SF5) | 196.0600 | −20.0000 | | |
| vinyl chloride or chloroethylene | CH2CHCl | 62.0500 | −13.4000 | −153.0000 | 0.9106 |
| bromo difluoro nitroso methane | BrF2CNO | 159.9200 | −12.0000 | | |
| 1-nitroso heptafluoro propane | CF3CF2CF2NO2 | 199.0300 | −12.0000 | −150.0000 | |
| trifluoro ethoxyl silane | C2H5OSiF3 | 130.1500 | −7.0000 | −122.0000 | |
| hexafluorodimethylamine | (CF3)2NH | 153.0300 | −6.7000 | −130.0000 | |
| ethyl trifluoro silane | C2H5SiF3 | 114.1400 | −4.4000 | −105.0000 | 1.2270 |
| perfluoro cyclobutane | C4F8 | 200.0300 | −4.0000 | −38.7000 | |
| 3-fluoro propylene | FCH2CHCH2 | 60.0700 | −3.0000 | | |
| perfluoro methyl mercaptan | F3CSCl | 136.5200 | −0.7000 | | |
| 2,2 difluoro propane | (CH3)2CF2 | 80.0800 | −0.4000 | −104.8000 | 0.9205 |
| nitro pentafluoro ethane | CF3CF3NO2 | 165.0200 | 0.0000 | | |
| perfluoro 2-butane | CF3CFCFCF3 | 200.0300 | 0.0000 | −129.0000 | 1.5297 |
| trans 2-butane | CH3CHCHCH3 | 56.1200 | 0.9000 | −105.5000 | 0.6042 |
| 1,1,1,2,2,3 hexafluoro propane | CH2FCF2CF3 | 152.0400 | 1.2000 | | |
| perfluoro cyclobutene | C4F6 | 162.0400 | 3.0000 | −60.0000 | 1.6020 |
| methyl bromide | CH3Br | 94.9400 | 3.6000 | −93.6000 | 1.6755 |
| bromo acetylene | BrCCH | 104.9400 | 4.7000 | | |
| pentachloro benzyl chloride | C6Cl5COCl | 312.8000 | 5.0000 | 87.0000 | |
| hexafluoro 1,3 butadiene | CF2CFCFCF2 | 162.0400 | 6.0000 | −132.0000 | 1.5530 |
| 2-chloro 1,1,1 trifluoroethane | ClCH2CF3 | 118.4900 | 6.9300 | −105.5000 | 1.3890 |
| dichloro fluoro methane or Freon 21 | Cl2CHF | 102.9200 | 9.0000 | −135.0000 | 1.4050 |
| 2-fluoro 1,3 butadiene | CH2CFCFCF2 | 72.0800 | 12.0000 | | 0.8430 |
| acetyl fluoride | CH3COF | 62.0400 | 20.8000 | | 1.0020 |
| 1,2 diclhloro 1,2 difluoro ethylene | CFClCFCl | 132.9200 | 21.1000 | −130.5000 | 1.4950 |
| 1-nitro heptafluoro propane | CF3CF2CF2NO2 | 215.0300 | 25.0000 | | |
| neopentyl chloride | (CH3)3CCH2Cl | 106.6 | 84.3000 | −20.0000 | 0.8660 |

Figure 10:
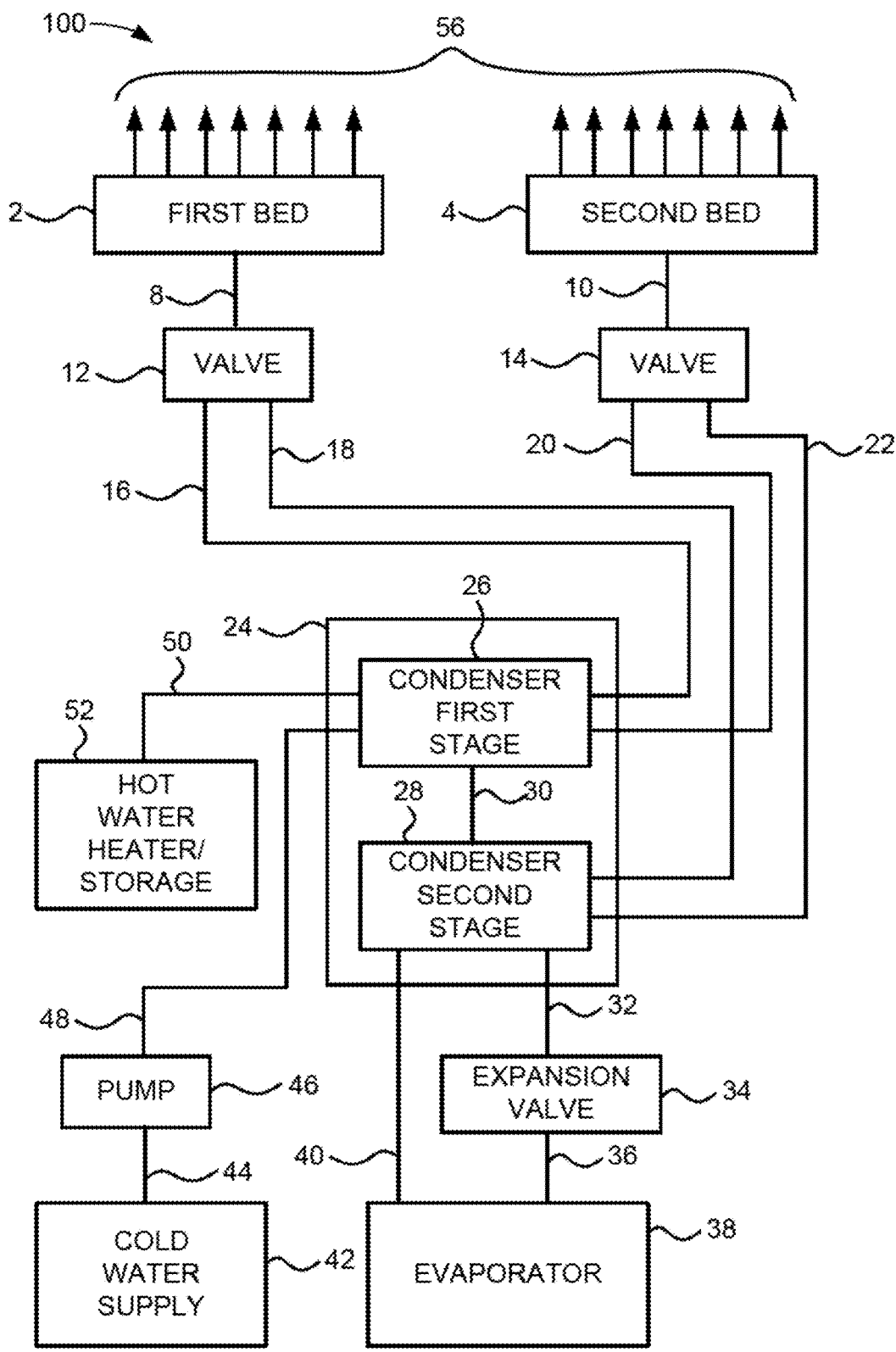
FIG. 10 illustrates the ADRS during a low-temperature period, according to one embodiment.

FIG. 10 illustrates one embodiment of the ADRS during the night time. The retractable sun shade 6 may be positioned to uncover both beds 2 and 4 and both beds may radiate heat 56. Most of the refrigerant may be adsorbed in bed 4 in some approaches.

Figure 11:
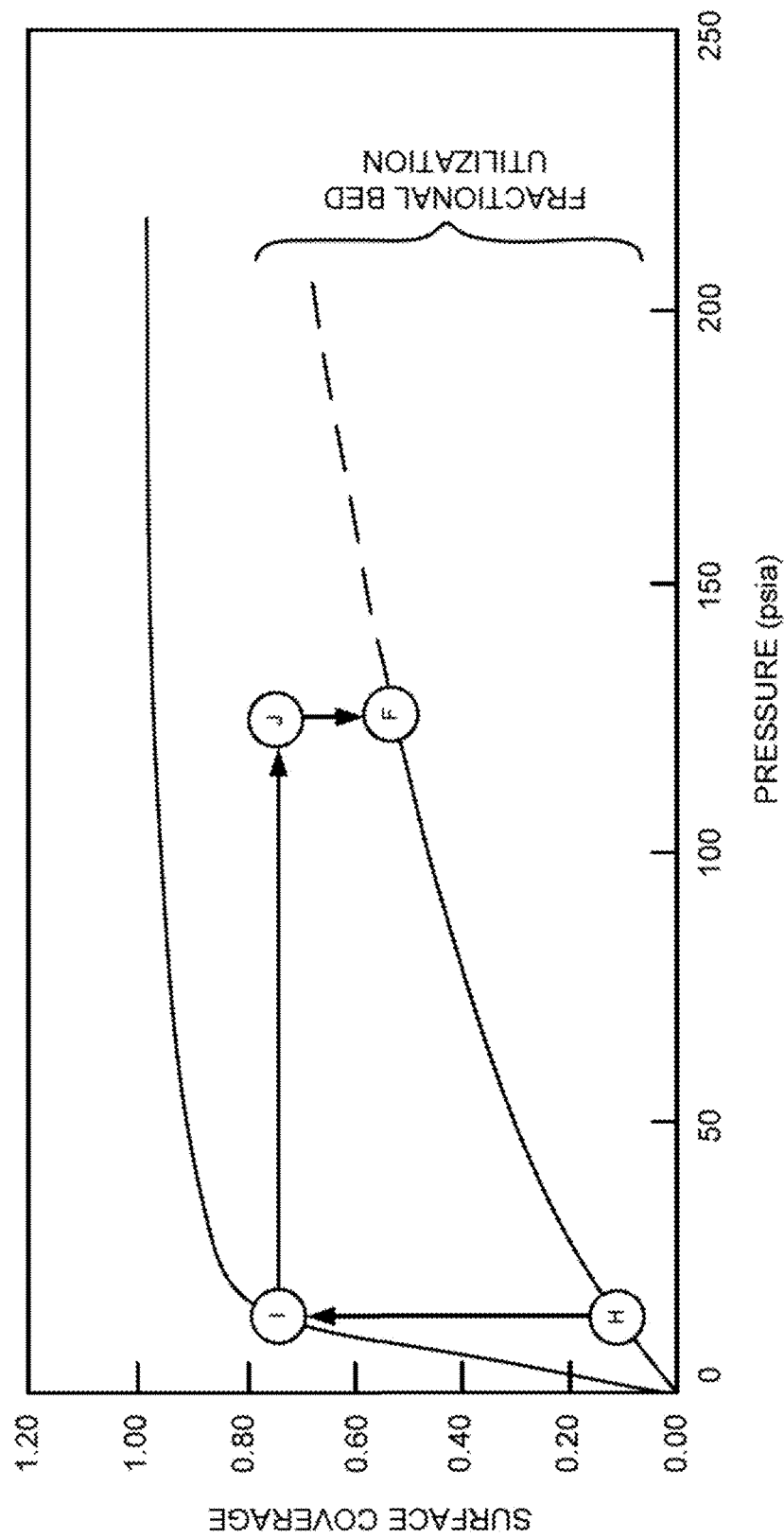
FIG. 11 illustrates the predicted Langmuir adsorption isotherm for a better refrigerant and adsorption-medium combination at various temperature levels, according to one embodiment.

FIG. 11 illustrates one embodiment of a scanning electron microscope view of a section of MOF showing pores in the MOF. The present disclosure may utilize MOF nanotechnology for dramatic enhancements in the active surface area of the adsorptive media. MOF nanotechnology, including, but not limited to, the advanced MOF technology developed by the Lawrence Livermore National Laboratory (LLNL), may be used in one or more embodiments of this invention. For example, carbon based MOFs may be made with surface areas ranging from 600 to 3125 square meters per gram. Compare with the best activated carbons made from coconut hulls and similar materials, which have specific surface areas of 100 to 1500 square meters per gram. Since sorption capacity is proportional to specific surface area, with the adsorption of approximately 1014 molecules per square meter in some cases, the higher surface area attainable with metal organic frameworks may reduce the required mass of the adsorption bed, thereby leading to a refrigeration or air conditioning system of lower weight and smaller size. In addition to the use of metal organic frameworks, other types of MOFs may be used including, but not limited to, a wide variety of MOFs made of silica and metal oxides, etc. and other MOFs as would be understood by one having ordinary skill in the art upon reading the present disclosure.

FIG. 11 illustrates one embodiment of the predicted Langmuir adsorption isotherm for a better refrigerant and adsorption-medium combination at various temperature levels. These predictions were based upon the free energy of adsorption and pre-exponential for calculation of the Langmuir parameter summarized below. In one approach, a possible refrigeration cycle is shown as an overlay on the isotherm. The legend gives predictions for various temperature levels (° F.) according to such an approach.

As shown in FIG. 11, temperature changes induced by thermal heating may be sufficient to cause enough change in surface coverage and gas-phase pressure to drive a practical refrigeration cycle. For a metal organic framework with a demonstrated active surface area of 3,125 square meters per gram, and assuming a monolayer coverage of isobutane, a mass loading of approximately 0.6 grains of isobutene per gram of MOF may be estimated. By using materials with even higher surface areas, loadings of 1 gram per gram or better may be possible in some embodiments.

In another embodiment, the fractional coverage of active sites on the surface of the MOF by adsorbed refrigerant may then be calculated from the Langmuir parameter and the gas-phase chemical activity of the species being adsorbed. The chemical activity is proportional to gas-phase above the surface where adsorption is occurring. Langmuir adsorption isotherms have been predicted for various compounds, including isobutane on zeolites, as a function of pressure and temperature. In the case of isobutane adsorbed on zeolite, predictions were based upon Langmuir parameters determined from the regression analysis of published data.

In one embodiment, where isobutene may be adsorbed on zeolite, temperature changes induced by thermal energy may be insufficient to cause enough change in surface coverage and gas-phase pressure to drive a practical refrigeration cycle. Similar predictions have been made with optimized combinations of refrigerant and adsorption media (optimum specified in terms of predicted Langmuir parameter). Temperature changes induced by thermal heating may be sufficient to cause enough change in surface coverage and gas-phase pressure to drive a practical refrigeration cycle in some approaches.

Adsorption of refrigerant on the surface of the MOF (or other adsorption media) may obey the Langmuir adsorption isotherm. The Langmuir parameter for species $K_i$ is defined by the Gibbs free energy of adsorption, the universal gas constant, and the absolute temperature:

$$K_i = \exp\left(\frac{-\Delta G_i}{RT}\right) \quad \text{Equation 1}$$

In one embodiment, the fractional coverage of active sites on the surface of the MOF by adsorbed refrigerant may then be calculated from the Langmuir parameter and the gas-phase chemical activity of the species being adsorbed (a). The chemical activity (a) is proportional to gas-phase above the surface where adsorption is occurring.

$$\frac{\theta}{1-\theta} = a\exp\left(\frac{-\Delta G_{ADS}}{RT}\right) \quad \text{Equation 2}$$

$$\theta = \frac{a\exp\left(\frac{-\Delta G_{ADS}}{RT}\right)}{a\exp\left(\frac{-\Delta G_{ADS}}{RT}\right)+1}$$

In other embodiments involving multi-component refrigerants, refrigerants may compete for available active sites, in accordance with the following modified adsorption isotherm.

$$\theta_i = \frac{K_i a_i}{1 + K_i a_i + K_l a_l} \quad \text{Equation 3}$$

Figure 12:
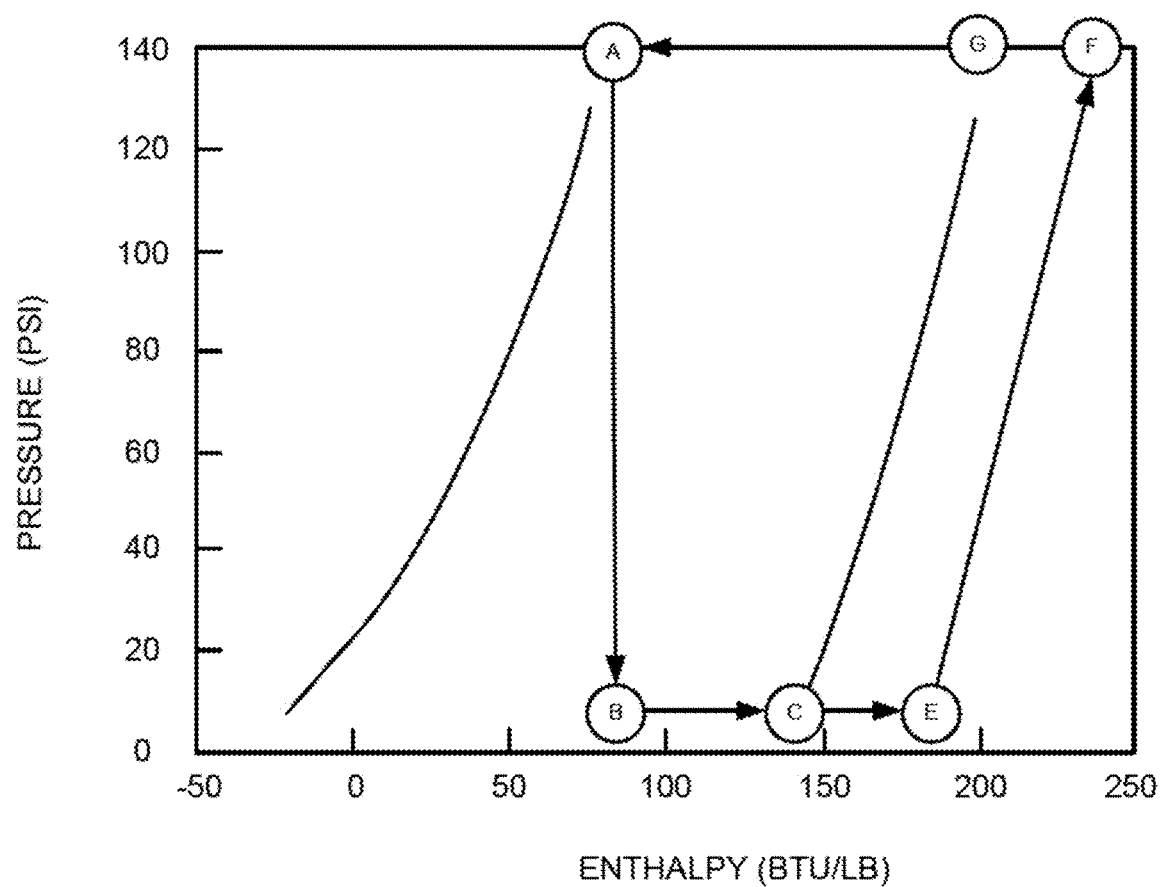
FIG. 12 illustrates a refrigeration cycle, according to one embodiment.

FIG. 12 illustrates one embodiment of a possible refrigeration cycle. The path from F to A may represent condenser operation between 175° F. and 140° F., removing superheat and the latent heat of vaporization from the refrigerant in one approach. In another embodiment, the path from A to B may represent the expansion of refrigerant, with partial condensation in the evaporator, which is assumed in this example to be operating at 10° F. Moreover, the adsorption bed may operate along the path between points E and F in yet another approach. These are calculations that may not account for the transient nature of the system in some embodiments.

Figure 13:
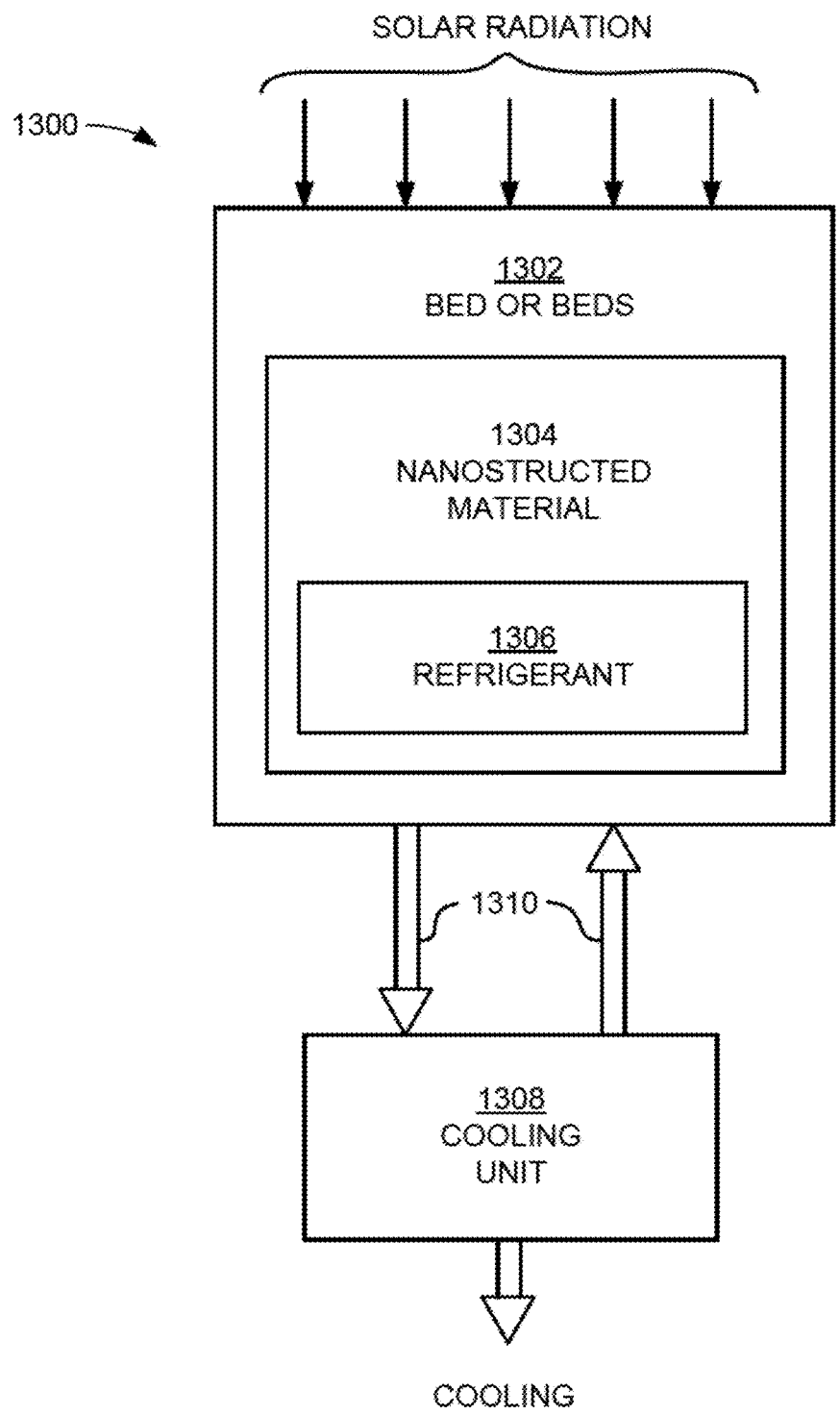
FIG. 13 illustrates another embodiment of a solar powered adsorption-desorption refrigeration system (ADRS) constructed in accordance with one embodiment of the present disclosure.

FIG. 13 illustrates another embodiment of a thermally controlled adsorption-desorption refrigeration system (ADRS) constructed in accordance with the present disclosure. As shown in FIG. 13, the thermally controlled adsorption-desorption refrigeration system may be designated generally by the reference numeral 1300. Reference numerals are used to designate various components, systems, units, and devices, which are generally identified as "item(s)" in FIGS. 7-14.

In one embodiment, item 1402 may be a bed(s) of high specific surface area adsorption media, including, but not limited to, a nanostructural foam, an MOF based media 1404, etc. or other high specific surface area adsorption media as would be understood by one having ordinary skill in the art. The bed(s) 1402 may be of high specific surface area adsorption media 1404 in one approach. Item 1404 may be any nanostructural material including, but not limited to, an MOF, a sol gel, a zeolite, etc. or any other nanostructural material as would be understood by one having ordinary skill in the art. Item 1406 may be a refrigerant.

Additionally, in one embodiment, item 1408 may be a cooling unit. Item 1408 may include a two-stage condenser and an expansion valve in one approach. Further, in one embodiment, item 1410 may be a circulation system for circulating the refrigerant from the bed or beds of adsorption media to the cooling unit to provide cooling from energy from the sun and to return the refrigerant from the cooling unit to the bed or beds of adsorption media.

The U.S. Department of Energy (DOE) estimates the total primary energy consumption for commercial buildings was 10.72 quadrillion BTU (quads) in 1983, compared with 14.74 quads for the residential sector. According to the DOE Building Technologies Program, 40-60% of the energy used in U.S. commercial (and residential) buildings is for HVAC, creating massive potential for energy savings with a system that could cut cooling energy use by at least 30-60%. Initial vertical segments in the commercial building market may include, but are not limited to, government and commercial office buildings; government facilities such as prisons, military bases, and schools; hotels and resorts; farming, wineries and other rural facilities; general light industrial offices, printers and clothing makers, etc.

The present disclosure relates to a thermally controlled MOF-based adsorption cooling system. In one embodiment of this cooling system, thermal energy may be focused by thermal collectors onto on bed, which may contain an ultra high surface area MOF. Heating may cause thermal desorption of a refrigerant previously adsorbed into the MOF's pores. In another approach, refrigerant desorption may increase the gas-phase pressure in the pores, and may thereby force the gaseous refrigerant to flow out of the irradiated bed and through a two-stage condenser. In the condenser, heat may be first removed from the hot gaseous refrigerant by a stream of water that eventually flows into a hot water heater and storage system. The refrigerant may then be further cooled by chilled refrigerant leaving the evaporator after vaporization.

After passing through the two-stage condenser, the gaseous refrigerant may undergo expansion through an expansion valve in one embodiment. A portion of the refrigerant may condense in the evaporator, while some of the refrigerant may be flashed and may exit the evaporator. The evaporator may absorb heat from the area being cooled, which may result in further vaporization of the refrigerant. In another approach, the cool, vaporized refrigerant may leaves the evaporator and may pass through tubes in the shell-and-tube heat exchanger comprising the second stage of the two-stage condenser. After leaving the tube side of this heat exchanger, the cool, vaporized refrigerant may flow back to the bed of MOF.

In one embodiment, most of the refrigerant may adsorb on the bed during the first cycle. When the refrigeration cycle is reversed, the refrigerant may thermally desorb from the bed in some approaches. As the cycling rate increases, the quantity of adsorption media, the system size, and the associated cost may become smaller.

As disclosed herein, some examples of the underlying features and advantages of the present disclosure may include, but are not limited to: (1) thermally controlled thermal desorption of a refrigerant from a suitable high-surface area media may be used instead of mechanical compressors as the basis of an efficient refrigeration cycle, thereby reducing the need for electrical power from grids for cooling homes and offices; (2) sorption capacity is proportional to specific surface area, with the adsorption of approximately 1014 molecules per square meter in some embodiments; (2) the higher surface area attainable with metal organic frameworks may reduce the required mass of the adsorption bed, thereby enabling the construction of an adsorption-type air conditioning system of lower weight and smaller size relative to those relying on commercially available sorbent materials; (3) metal organic framework may be fabricated as monolithic flat sheets for optimal heat and mass transfer in the adsorption bed; (4) metal organic frameworks may be readily modified to tune the thermodynamics of adsorption, providing flexibility in the selection of refrigerants-including non-CFCs-and in operating temperatures; (5) injection-molded silica MOF has the highest heat transfer resistance of any blown engineered material and may be used to control heat leakage in the system, thereby increasing overall efficiency; (6) by eliminating moving parts, longer service life, lower maintenance costs and lower levels of noise may be achieved, etc. as would be understood by one having ordinary skill in the art upon reading the present disclosure.

MOFs are among the most versatile materials available owing to their wide variety of exceptional properties. For example, MOFs are known to exhibit the lowest thermal conductivities (0.017-0.021 W/m·K), sound velocities (<500 m/s), and refractive indexes (1.001-1.15) of any bulk solid material. Most of the properties of bulk MOFs may also be exhibited in other forms of the material, including, but not limited to thin sheets, films, etc. or other material as would be understood by understood by one having ordinary skill in the art upon reading the present disclosure, which may be important for integration of these materials into devices. As a result, MOFs have been developed for a variety of applications, including, but not limited to, catalysis, sensing, thermal insulation, waste management, molds for molten metals, optics, capacitors, energetic composites, imaging devices, cosmic dust collection, high-energy-density physics applications, etc.

LLNL is recognized as a world leader in MOF research, holding several patents in the technology dating back to the mid-1990s. Organic and metal organic frameworks were both invented at LLNL, and much of the technology resulting from that research has been licensed for various technologies, including capacitors and desalination. The process used to synthesize high-surface-area metal organic framework adsorbents was also developed at the Laboratory, where the materials are currently used as adsorbents for hydrogen in low-pressure storage tanks. In addition, the rapid supercritical extraction (RSCE) process that may be used to fabricate the insulating MOF parts in accordance to one embodiment was developed and patented by LLNL. The RSCE process—similar to injection molding, a common process used to manufacture some plastics—may offer a number of advantages over conventional supercritical drying, including simpler and less costly hardware, monolithic gels that do not have to be pre-formed, and an overall much faster process—the entire process for making monolithic parts may be accomplished in just a few hours instead of the several days required by conventional supercritical drying. The RSCE process may be extremely valuable in the fabrication of conformable monolithic for the proposed cooling system's insulation in some approaches.

Many conventional solar concentrators rely on parabolic mirrors to heat pipes located at the focal points of the mirrors. In the case of adsorptive refrigeration and cooling systems, this may dictate that the adsorption media be placed in a cylindrical envelope for the most efficient heating. Alternatively, large inexpensive Fresnel optics, now available, may be used for solar collection from the solar-side of planar panels, providing designers with some engineering advantage. In one embodiment, commercially available molded acrylic lenses or reflective concentrators may be used.

Metal organic framework (MOF) is a unique porous solid with network structures consisting of interconnected carbon particles and, as a result, these materials exhibit many interesting properties, such as high surface-to-volume ratios, continuous porosities and high electrical conductivity. Lawrence Livermore National Laboratory has developed a synthetic approach to fabricate MOFs with BET surface areas of over 3,000 $m^2/g$. These surface area values are comparable to those of the highest surface area activated carbons. In one embodiment, the synthetic strategy may involve the thermal activation of a MOF material with structural features (particles and pores) on the micrometer scale. This approach may not only provide access to high surface areas in MOF materials but may also afford monolithic materials with bimodal porosity (macro- and micropores).

An important criterion for effective physisorption is a high surface area that exposes a large number of sorption sites to ad-atom or ad-molecule interaction. Moreover, these sites need to have potential wells that are sufficiently deeper than kT if physisorbents are to operate at reasonable engineering temperatures. Porous carbon materials are promising candidates for the physisorption of refrigerant gases due their lightweight frameworks and high accessible surface areas. High surface area carbons have been studied extensively for low pressure storage of transportation fuels, such as hydrogen and methane. In one embodiment, appreciable amounts of methane may be adsorbed on conventional high surface area activated carbons at 298 K and 3.5 MPa. More specifically, the loading of $CH_4$ on such activated carbons may be approximately 17 weight percent or 0.17 grams of methane per gram of solid carbon.

Metal organic frameworks (MOFs) are a unique class of porous carbons that possess ultrafine cell sizes, continuous porosities and low mass densities. These properties arise from the MOF microstructure, a three-dimensional network of interconnected primary carbon particles with diameters that can range from a few nanometers to several microns. In one embodiment, mechanically robust MOF monoliths may be synthetically fabricated with BET surface areas in excess of 3,000 m²/g of metal organic framework, substantially greater than that achievable with the best activated carbons. These surface area values are the highest reported for MOFs and exceed the accessible surface area in most commercially available activated carbons.

In addition to extremely large specific surface areas, MOFs exhibit a number of other desirable qualities for the adsorption of refrigerant gases. For example, the porosity in these MOFs is bimodal, consisting of a large population of micropores (0.7 to 1.2 nanometers in diameter) connected by a continuous macroporous network. Hierarchically porous carbons of this type are superior to carbons with unimodal porosity (i.e. activated carbons) in terms of diffusion efficiency and surface area. In one embodiment, the surface chemistry of the MOF may be readily modified to tune the interaction (binding energy) between the refrigerant gas and the adsorbent. This aspect may be particularly important for controlling desorption of refrigerant from the MOF during thermal heating.

MOFs do not require the specialized drying processes including, but not limited to supercritical extraction, that are typically employed in the synthesis of other MOF materials, minimising both the fabrication time and cost associated with these materials. In yet another embodiment, the MOFs may be fabricated in a variety of forms, including, but not limited to, conformable monoliths, a feature that may be advantageous for this application. The flexibility associated with the design of these materials may not only facilitate the optimization of adsorbate-adsorbent interactions, but also maximize the gravimetric and volumetric capacities of these MOF materials in some approaches.

In one embodiment, the system may use a two-stage condenser to cool and condense the desorbed refrigerant. The first stage may use an external water stream, resulting in a hot water stream for other uses. The second stage may be chilled by the return line of evaporated and expanded refrigerant.

In one embodiment, the evaporator may be a two-phase boiler with both liquid and gaseous refrigerant. Liquid may continuously evaporate as heat is absorbed from the building primary heat exchanger. Additionally, in some approaches, the primary heat exchanger may be of any conventional design, which will allow easy retrofit of the proposed system into new or existing construction.

Silica MOFs are a special class of open-cell foams derived from highly cross-linked gels that are dried using special techniques (supercritical extraction) to preserve the tenuous solid network. These materials have ultrafine cell and pore sizes (<1,000 Å), continuous porosity, high surface area density, and a microstructure composed of interconnected colloidal-like particles or polymeric chains with characteristic diameters of 100 Å. This microstructure is responsible for the unusual optical, acoustical, thermal, and mechanical properties of silica MOFs. In fact, silica MOFs have the lowest thermal conductivity (0.017-0.021 W/m·K) of any solid material and, as a result, have been commercially developed for thermal insulation applications. In one embodiment, silica aerogels may be used as insulators for the proposed AC system. The rapid supercritical extraction process used to fabricate these materials is scalable and may be used for high-throughput production of insulating parts in some approaches.

In one embodiment, the components as disclosed herein may be designed to be compatible with existing building ventilation systems.

Figure 14:
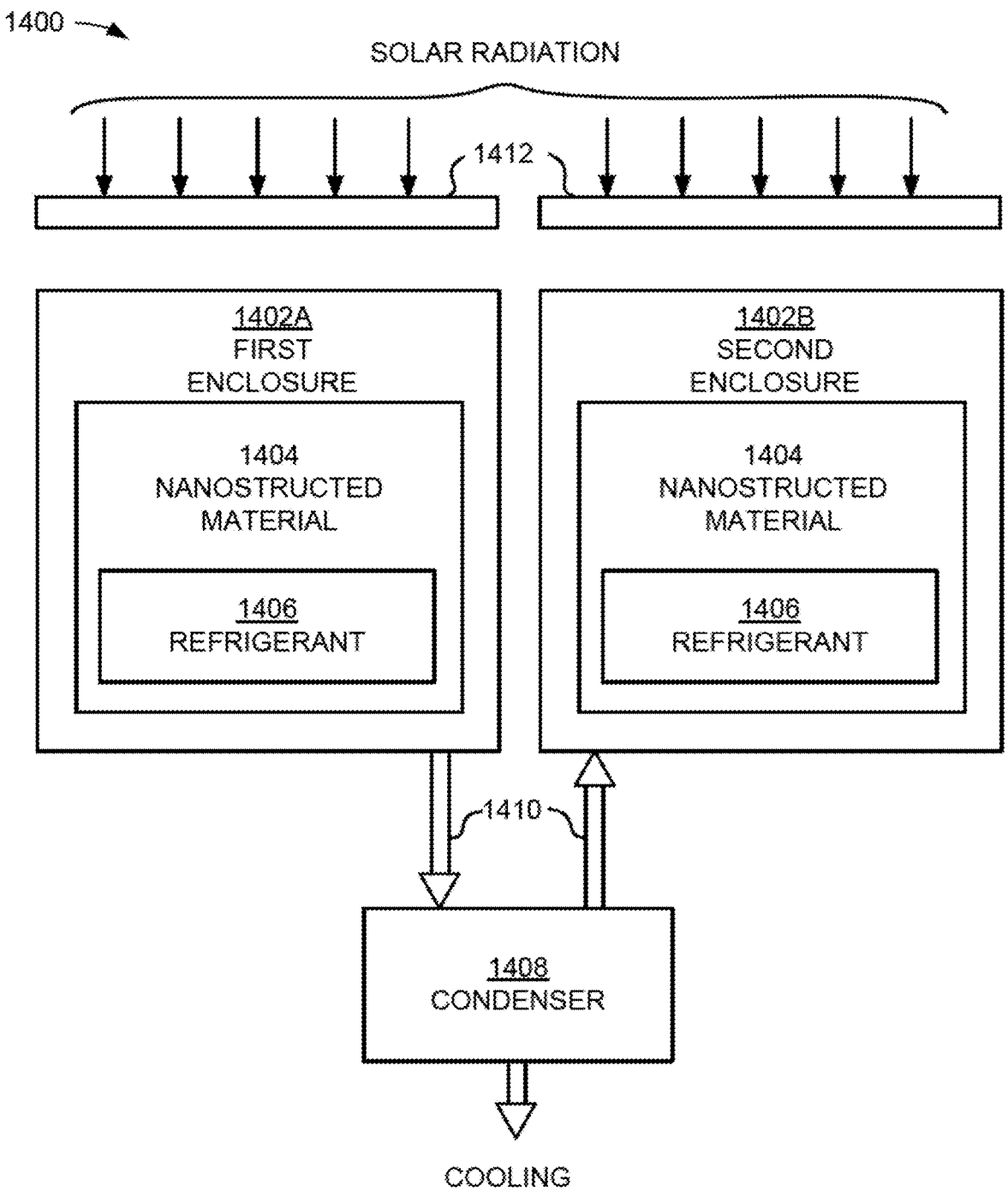
FIG. 14 illustrates yet another embodiment of a solar powered adsorption-desorption refrigeration system (ADRS) constructed in accordance with the present disclosure.

FIG. 14 illustrates one embodiment of a thermally controlled adsorption-desorption refrigeration system (ADRS) constructed in accordance with the present disclosure. As shown in FIG. 14, the thermally controlled adsorption-desorption refrigeration system may be designated generally by the reference numeral 1400. Reference numerals may be used to designate various components, systems, units, and devices, which are generally identified as "item(s)" in FIGS. 7-14.

In one embodiment, item 1402A may be a first bed of high specific surface area adsorption media, including, but not limited to, nanostructural foam, MOF based media, etc. or other high specific surface area adsorption media as would be understood by one having ordinary skill in the art upon reading the present disclosure. In another embodiment, item 4 may be a second bed with the same properties of the first bed item 1402A. In yet another embodiment, item 1402B may be a retractable sun shade that may be moved to cover or uncover either beds 1402A or 4 or may be positioned to uncover both beds 1402A and 4 at the same time. Moreover, in another embodiment, the beds of high specific surface area adsorption media, item 1402A and item 1402B, may be any nanostructural material including, but not limited to, an MOF, a sol gel, a zeolite, etc. or any other nanostructural material as would be understood by one having ordinary skill in the art.

In one embodiment, item 1412 may be any blocking system adapted to selectively block thermal energy including, but not limited to, a louvered shade, a shutter shade, an electronic blocking system for blocking energy from the sun, etc. or any other system for blocking thermal energy as would be understood by one having ordinary skill in the art.

As shown in FIG. 14, refrigerant desorption may increase the gas phase pressure in the pores of the adsorption media, thereby forcing the gaseous refrigerant (CR) to flow-out of the first bed 1402A in one approach. In another approach, the GS may flow to the condenser 1408. After passing through the two-stage condenser, the GS may undergo isenthalpic expansion in the expansion valve in yet another embodiment. Additionally, in another embodiment, a portion of the GS may condense in the evaporator while some of the GS may be flashed (chilled refrigerant) and exit the evaporator. The evaporator may absorb heat from the room or area being cooled, which may result in further vaporization of the GS.

Additionally, in one embodiment, the chilled valorized GS may exit the evaporator and, through a line, may enter the condenser second stage and proceed through the tubes of a shell-and-tube heat exchanger which comprises the condenser second stage of the two-stage condenser. In another approach, the GS may then leave the condenser by way of a line and pass through a valve and deposited in the-adsorption media of bed 1402B, which is at a lower temperature than the first bed 1402A.

In other approaches, an adsorptive cooling system may take alternative embodiments. For example, in one embodiment an adsorptive cooling system includes a first highly adsorptive structure positioned to receive thermal energy from a thermal energy source and a second highly adsorptive structure positioned to receive thermal energy from the thermal energy source (such as bed 1402A and/or 1402B of FIG. 14).

In more approaches, the adsorptive cooling system may further include a second highly adsorptive structure comprising a second substrate; a second metal organic framework adhered to the second substrate, where the second metal organic framework is adapted for adsorbing and desorbing a refrigerant according to predetermined thermodynamic conditions, a cooling unit; and a circulation system adapted for circulating a refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure.

In still more approaches, an adsorptive cooling system includes a first highly adsorptive structure positioned to receive thermal energy from a thermal energy source. Moreover, as described above the first highly adsorptive structure may include a first substrate and a first metal organic framework adhered to the first substrate. Similarly, in some approaches a second highly adsorptive structure positioned to receive thermal energy from the thermal energy source includes a second substrate; a second metal organic framework adhered to the second substrate, a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, where the first and second metal organic frameworks are each adapted for adsorbing and desorbing a refrigerant according to predetermined thermodynamic conditions.

In some approaches, the first and/or second substrate may include a plurality of microchannels, where each of the first metal organic framework and the second metal organic framework are adhered to an interior and/or exterior surface of the plurality of microchannels. Moreover, the microchannels may be defined by grooves in a surface of the substrate nearest the metal organic framework, surfaces of a plurality of microcapillaries arranged along a surface of the substrate nearest the metal organic framework, ridges in a surface of the substrate nearest the metal organic framework, etc. as would be understood by one having ordinary skill in the art upon reading the present descriptions.

Of course, the plurality of microchannels may permit adherence of the metal organic framework in any location as would be understood by one having ordinary skill in the art upon reading the present descriptions. In particular, in several approaches the metal organic framework may be adhered to one or more of the interior surface of a microcapillary, the exterior surface of a microcapillary, the exterior surface of a ridge and/or valley of a plurality of microchannels, any combination thereof, and etc. as would be understood by one having ordinary skill in the art upon reading the present descriptions.

Moreover still, in preferred embodiments the microchannels provide improved ingress and egress to and from the metal organic framework for a binding agent such as a refrigerant, especially relative to a traditional cylindrical canister disposition for a highly adsorptive structure such as a metal organic framework. Notably, as understood herein grooves may include in inner and/or outer surfaces of the substrate.

Several exemplary embodiment of a substrate having a plurality of microchannels is depicted in FIGS. 15A-15C, with several corresponding microchannel arrangements shown in FIGS. 16A-16D. In particular, as shown in FIG. 15A, an adsorptive cooling system may include a one or more substrates 1502 such as corrugated substrate 1502. Moreover, such corrugated substrates may be arranged as shown in FIG. 15A to form intermittent diamond-like structures to maximize surface area of an overall absorptive structure. Furthermore, the corrugated substrate may be further defined by a plurality of peaks 1506 and valleys 1504, in some approaches.

Moreover, as shown particularly in FIGS. 15B and 15C, the substrate may further include a plurality of microchannels such as shown in zoomed region 1508. In particular, in some embodiments the substrate 1502 may include a plurality of microcapillaries 1510 as shown substantially in FIG. 15B. Additionally and/or alternatively the substrate 1502 may include a plurality of grooves such as shown in FIG. 15C, such grooves being defined by a plurality of peaks 1514 and valleys 1512, in some approaches. Of course, as would be understood by one having ordinary skill in the art upon reading the present descriptions, other arrangements of microchannels may be employed, including nominal variations to the structural arrangements shown in FIGS. 15B-15C, in various approaches.

Moreover still, the microchannels may be arranged according to any suitable configuration such as shown in FIGS. 16A-16D, in some approaches. Particularly, the microchannels may be arranged in a concentric patterns of channels such as to substantially form parallel channels in the shape of a U, as shown in FIG. 16A, a straight line as shown in FIG. 16B, an "s" curve as shown in FIG. 16C, and a zig-zag pattern as shown in FIG. 16D, in various embodiments. Of course, as would be understood by one having ordinary skill in the art upon reading the present descriptions, any suitable arrangement may be employed and those arrangements depicted in FIGS. 16A-16D are made merely for illustrative purposes.

In particularly preferred approaches, an adsorptive cooling system as disclosed herein further characterized by a 7 kilowatt (kW) cooling capacity and/or an electrical to cooling energy coefficient of performance (COP) greater than 3.8.

Different embodiments of Applicant's invention may include or incorporate one or more of the following features:

Solar driven adsorption-based refrigeration cycle—This invention directly converts solar heat to the work of compression necessary to drive the adsorption-based refrigeration system. The outer surface of the pressure envelope surrounding the adsorption bed would be coated to maximize the absorption of solar radiation. Solar concentration may also be used, exploiting concave mirrors and large-format Fresnel lenses.

High surface area MOF adsorption beds—This invention exploit's LLNL's MOF nanotechnology for dramatic enhancements in the active surface area of the adsorptive media. LLNL's advanced MOF technology will be used in one embodiment of this invention. For example, carbon based MOFs can be made with surface areas ranging from 600 to 3125 square meters per gram. In contrast, the best activated carbons, made from coconut hulls and similar materials, have specific surface areas of 100 to 1500 square meters per gram. Since sorption capacity is proportional to specific surface area, with the adsorption of approximately 1014 molecules per square meter in some cases, the higher surface area attainable with metal organic frameworks can reduce the required mass of the adsorption bed, thereby leading to a refrigeration or air conditioning system of lower weight and smaller size. In addition to the use of metal organic frameworks, other types of MOFs can also be used, including a wide variety of MOFs made of silica and metal oxides.

Adsorption bed in form of monolithic sheets—Sheets of monolithic metal organic frameworks provide not only ultra high surface area, but also the ability to construct flat sheets with optimal heat and mass transfer characteristics. These monolithic sheets of MOF can be bonded to the inner surfaces of the pressure envelope surrounding the adsorption bed.

Ability to use non-CFC refrigerants—It is now widely accepted that CFC, HFC, and HCFC refrigerants, as well as other halogenated molecules, pose a serious threat to the Earth's ozone layer. The use of non-halogenated refrigerants is therefore desirable from an environmental perspective. This invention is capable of using a wide variety of both halogenated, as well as more environmentally benign non-halogenated refrigerants.

Exceptional thermal insulation—In one embodiment, the invention uses injection-molded silica MOF for thermal insulation. This insulation has the highest heat transfer resistance of any known engineering material, and will therefore help control heat leakage in the refrigeration and air conditioning system, therefore increasing the overall efficiency of the system.

No moving parts—The invention relies on the solid adsorption bed for compression, and has no moving parts, Therefore; the service life of refrigeration and air conditioning cycles based upon this technology are expected to have unlimited service life, and virtually eliminate wear out associated with moving parts. No lubricants are required. The elimination of moving parts will dramatically reduce the noise from the cooling system, which will be especially desirable in urban settings.

Hermetically sealed system—By eliminating the need for moving parts and electrical feed-through, a hermetically sealed pressure envelope that contains the refrigerant can be used. This will minimize the probability of refrigerant leakage from the system, and will therefore eliminate the need for periodic charging of the system with makeup refrigerant.

Enhanced solar collection—The world's largest Fresnel optics, originally developed for the National Ignition Facility, can be used to enhance solar concentration and increase the upper operating temperature of the adsorption bed during thermal desorption, thereby achieving higher compression and greater efficiency. Depending upon the convention used, this feature will increase the COP (coefficient of performance), the SEER (seasonal energy efficiency rating), or the EER (energy efficiency rating) of the system.

Flexible heating options—Sufficient flexibility to use fossil fuel or electricity for auxiliary heating. This system can also be operated from other heat sources, including waste heat from automotive engines, industrial plants, and nuclear power plants. This novel refrigeration system is therefore suitable for high latitude, cold climates and cloudy days.

Integration with hot water heater—The system will have an integrated hot water heater or heaters.

Benefits

Applicant's invention benefits including the following:

Compared to traditional cooling systems, this technology has several advantages. For example, a carbon-based actuator material is light-weight, inexpensive and environmentally friendly (e.g., lead is not a required material). Also, the technology is scalable, that is, large monolithic actuators can be envisioned, e.g., greater than about 1 mm$^3$, greater than about 1 cm$^3$, greater than about 10 cm$^3$, etc. Moreover, such larger structures may be formed of one contiguously-formed structure or several smaller structures coupled together. Moreover still, the material can be formed in many different shapes, for example as depicted in FIGS. 2-5.

Further advantages include the technology is safe: a low-voltage driving signal may be used in some embodiments. Further, the material in some embodiments is thermally stable up to at least 1000 degrees C. (in an inert atmosphere), and potentially up to about 1500 degrees C. and thus may allow for high temperature applications depending on the thermal stability of the electrolyte. In addition, the material in some embodiments is equally well-suited for hydrogen storage, supercapacitor and electro-catalysis applications (fuel cells).

1. Solar powered with flexibility for alternative heating options
2. Ultra-high surface area adsorption media, with substantially higher refrigerant adsorption capacity per mass of adsorption bed, reducing size and making installation easier
3. No moving parts, extreme reliability, and silent operation
4. Hermetically sealed refrigeration loops, preventing leakage, eliminating need for lubricants and recharging, and enabling recycling of refrigerant
5. Monolithic sheets of adsorption media for superior heat and mass transfer
6. World's best-known insulation better control of heat flow and improved system efficiency
7. Higher thermal desorption temperature and compression for better efficiency
8. Integration of other household appliances, such as hot water heater.

Additional details of Applicant's invention are described and illustrated in U.S. Provisional Patent Application No. 61/256,243 entitled "Solar-Powered Adsorptive Refrigeration Cycle with Nanostructural Foam & MOF Based Media" filed Oct. 29, 2009 by Farmer, which is hereby incorporated in its entirety by reference for all purposes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A product comprising a highly adsorptive structure, the highly adsorptive structure comprising:
    a corrugated substrate having a plurality of peaks and valleys, the valleys being defined between the peaks, wherein each of the valleys of the substrate has a plurality of microchannels extending therealong; and
    a metal-organic framework (MOF) comprising a plurality of metal oxide components interconnected with each other by a plurality of organic spacer molecules thereby creating a network of continuous pores defined by the metal oxide components interconnected with each other by the plurality of organic spacer molecules for adsorbing and retaining a fluid;
    wherein the MOF is coupled to at least one interior and/or exterior surface of the plurality of microchannels of the substrate, wherein the MOF is configured to adsorb and desorb a refrigerant under predetermined thermodynamic conditions.

2. The product as recited in claim 1, wherein the predetermined thermodynamic conditions are based on an identity of each of: the plurality of metal oxide components, the plurality of organic spacer molecules, and the refrigerant.

3. The product as recited in claim 1, wherein the MOF is characterized by a surface area of at least about 5000 $m^2/g$.

4. The product as recited in claim 1, wherein the MOF is characterized by a pore structure, wherein the pore structure is determined based on an identity of each of: the plurality of metal oxide components and the plurality of organic spacer molecules.

5. The product as recited in claim 1, wherein the refrigerant is selected from the group consisting of: methyl silane, propylene, propane, propadiene, cyclopropane, dimethyl ether, methyl acetylene, methyl phosphine, bromo difluoro nitroso methane, methyl nitrate, isobutene, isobutylene, 1-butene, amino methane, 1,3 butadiene, butane, trans 2-butene, trimethyl amine, cis 2-butene, 1-butene-3-one, vinyl acetylene, methane thiol, fulvene, 1-butyne, neopentane, butadiyne, methylallene, cyclobutane, acetaldehyde, cycloneptane.

6. A product comprising a highly adsorptive structure, the highly adsorptive structure comprising:
a substrate, wherein the substrate comprises a plurality of peaks and valleys, the valleys being defined between the peaks, wherein each of the valleys of the substrate has a plurality of microchannels extending therealong; and
a metal-organic framework (MOF), wherein the MOF is coupled to an interior and/or exterior surface of the plurality of microchannels.

7. The product as recited in claim 6, wherein the microchannels are defined by a plurality of ridges and second valleys on a surface of the substrate nearest the MOF, wherein the MOF is coupled to at least one exterior surface of the second valleys.

8. The product as recited in claim 7, wherein the microchannels are arranged to form a plurality of parallel channels.

9. The product as recited in claim 6, wherein the metal organic framework is biased toward the substrate for increasing a thermal conductivity between the metal organic framework and the substrate, wherein the microchannels provide ingress and egress paths for a refrigerant.

10. The product as recited in claim 6, wherein the microchannels are defined by inner and/or outer surfaces of a plurality of microcapillaries of the substrate.

11. The product as recited in claim 10, wherein the microcapillaries provide ingress and egress paths for a refrigerant.

12. The product as recited in claim 1, wherein the refrigerant is adsorbed to the MOF, wherein the refrigerant desorbs from the MOF at a temperature of less than 90° C.

13. The highly adsorptive structure as recited in claim 1, further comprising a container enclosing the MOF coupled to the substrate, the container having an opening configured for ingress and egress of the refrigerant.

14. The product as recited in claim 13, further comprising a circulation system configured to facilitate circulation of the refrigerant to and from the MOF coupled to the substrate.

15. An adsorptive cooling system comprising:
a highly adsorptive structure as recited in claim 1 and positioned to receive thermal energy from a thermal energy source;
a second highly adsorptive structure positioned to receive thermal energy from the thermal energy source, the second highly adsorptive structure comprising:
a second substrate; and
a second MOF adhered to the second substrate,
wherein the second MOF is configured to adsorb and desorb a refrigerant under predetermined thermodynamic conditions, and
a cooling unit; and
a circulation system configured to circulate a refrigerant from the highly adsorptive structure and/or the second highly adsorptive structure to the cooling unit to provide cooling from the thermal energy source and to return the refrigerant from the cooling unit to the highly adsorptive structure and/or the second highly adsorptive structure.

16. The product as recited in claim 1, wherein the MOF comprises a plurality of micropores and macropores, the micropores each having a diameter in a range from 0.7 to 1.2 nanometers.

17. A product comprising highly adsorptive structures, product comprising:
a first highly adsorptive structure configured to receive thermal energy from a thermal energy source, the first highly adsorptive structure comprising:
a first substrate; and
a first metal-organic framework (MOF) comprising a plurality of metal components coordinated to a plurality of organic spacer molecules;
wherein the first MOF is coupled to at least one surface of the first substrate,
wherein the first MOF is configured to adsorb and desorb a refrigerant under predetermined thermodynamic conditions;
a second highly adsorptive structure configured to receive thermal energy from the thermal energy source, the second highly adsorptive structure comprising:
a second substrate; and
a second MOF adhered to the second substrate,
wherein the second MOF is configured to adsorb and desorb a refrigerant under predetermined thermodynamic conditions
a cooling unit;
a circulation system configured to circulate a refrigerant from the first highly adsorptive structure and/or the second highly adsorptive structure to the cooling unit to provide cooling from the thermal energy source and to return the refrigerant from the cooling unit to the first highly adsorptive structure and/or the second highly adsorptive structure; and
a blocking system configured to prevent the first highly adsorptive structure and/or the second highly adsorptive structure from receiving the thermal energy from the thermal energy source,
wherein the thermal energy source includes a solar energy source,
wherein the product has a 7 kilowatt cooling capacity and/or an electrical to cooling energy coefficient of performance greater than 3.8.

18. The product as recited in claim 17, wherein the first substrate and the second substrate each comprise a plurality of microchannels, wherein the first MOF is coupled to an interior and/or exterior surface of the plurality of microchannels of the first substrate, and wherein the second MOF is coupled to an interior and/or exterior surface of the plurality of microchannels of the second substrate, wherein the first MOF is configured to desorb the refrigerant at about $10^{14}$ molecules per square meter.

19. The system as recited in claim 15, further comprising a blocking system configured to block the highly adsorptive structure as recited in claim 1 and/or the second highly adsorptive structure from receiving the thermal energy from the thermal energy source.

20. The product as recited in claim 1, wherein the microchannels are defined by a plurality of etches in the substrate, wherein the etches are arranged in parallel in the substrate, wherein the microchannels provide ingress and egress paths for the refrigerant.

\* \* \* \* \*